US012713493B2

(12) United States Patent
Hasanzadezonuzy et al.

(10) Patent No.: US 12,713,493 B2
(45) Date of Patent: Aug. 18, 2026

(54) BEAM SPECIFIC IDLE DISCONTINUOUS RECEPTION CONFIGURATION

(71) Applicant: QUALCOMM Incorporated, San Diego, CA (US)

(72) Inventors: Aria Hasanzadezonuzy, Somerville, NJ (US); Navid Abedini, Basking Ridge, NJ (US); Jianghong Luo, Skillman, NJ (US); Naeem Akl, Bridgewater, NJ (US); Konstantinos Dimou, New York City, NY (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 17/890,164

(22) Filed: Aug. 17, 2022

(65) Prior Publication Data

US 2024/0064854 A1 Feb. 22, 2024

(51) Int. Cl.
*H04W 76/28* (2018.01)
*H04W 16/28* (2009.01)
*H04W 68/00* (2009.01)
*H04W 74/0833* (2024.01)

(52) U.S. Cl.
CPC ........... *H04W 76/28* (2018.02); *H04W 16/28* (2013.01); *H04W 68/00* (2013.01); *H04W 74/0833* (2013.01)

(58) Field of Classification Search
CPC ..... H04W 76/28; H04W 16/28; H04W 68/00; H04W 74/0833; H04W 76/00; H04W 76/20; H04W 16/00; H04W 16/24; H04W 28/00; H04W 28/02; H04W 68/005; H04W 74/00; H04W 74/002
See application file for complete search history.

(56) References Cited

U.S. PATENT DOCUMENTS

| | | | | |
|---|---|---|---|---|
| 9,730,152 | B2 * | 8/2017 | Lin | H04L 5/1469 |
| 10,129,862 | B1 * | 11/2018 | Wu | H04L 25/0212 |
| 11,696,256 | B2 * | 7/2023 | Park | H04W 80/08 370/329 |
| 2017/0013443 | A1 * | 1/2017 | Gopalakrishnan | H04W 8/186 |
| 2018/0220345 | A1 * | 8/2018 | Moon | H04W 24/10 |
| 2019/0045481 | A1 * | 2/2019 | Sang | H04B 1/713 |

(Continued)

*Primary Examiner* — Yuwen Pan
*Assistant Examiner* — Samuel H. Leonard
(74) *Attorney, Agent, or Firm* — Holland & Hart LLP

(57) ABSTRACT

Methods, systems, and devices for wireless communications are described. Idle discontinuous reception (I-DRX) configurations may be managed on a per beam or a per subset of beams basis. The network may indicate, via system information, the I-DRX configuration for a given beam or subset of beams. A user equipment (UE) in an idle mode may receive paging occasions via the given beam in accordance with the indicated I-DRX configuration for that beam. In some examples, system information may indicate a list of beams and corresponding I-DRX configurations for each beam in the list of beams. In some examples, system information may indicate the I-DRX configuration for the beam on which the system information is transmitted. If a UE changes beams, the UE may receive system information via the new beam that indicates an I-DRX configuration for the new beam before applying the I-DRX configuration to the new beam.

30 Claims, 19 Drawing Sheets

(56) References Cited

U.S. PATENT DOCUMENTS

| | | | | |
|---|---|---|---|---|
| 2019/0098597 | A1* | 3/2019 | Basu Mallick | H04W 8/06 |
| 2020/0092846 | A1* | 3/2020 | Deng | H04W 68/025 |
| 2020/0120634 | A1* | 4/2020 | Lee | H04W 68/06 |
| 2020/0221508 | A1* | 7/2020 | Huang | H04W 72/23 |
| 2021/0289582 | A1* | 9/2021 | Bergstrom | H04W 52/028 |
| 2021/0351888 | A1* | 11/2021 | Park | H04W 72/51 |
| 2022/0109535 | A1* | 4/2022 | Kim | H04L 5/0053 |
| 2022/0159746 | A1* | 5/2022 | Ko | H04W 74/0841 |
| 2023/0164732 | A1* | 5/2023 | Lee | H04L 5/0053<br>455/456.1 |
| 2023/0199911 | A1* | 6/2023 | Jung | H04W 8/186<br>370/329 |
| 2023/0247555 | A1* | 8/2023 | Wagner | H04W 52/0235<br>370/311 |
| 2023/0292285 | A1* | 9/2023 | Lee | H04W 68/02 |
| 2024/0031983 | A1* | 1/2024 | Ye | H04W 52/0219 |
| 2024/0155559 | A1* | 5/2024 | Nader | H04W 68/02 |
| 2024/0260092 | A1* | 8/2024 | Prasad | H04L 1/1887 |
| 2025/0193764 | A1* | 6/2025 | Jung | H04W 36/362 |
| 2025/0240789 | A1* | 7/2025 | Shrivastava | H04W 72/30 |

* cited by examiner

600

BEAM SPECIFIC IDLE DISCONTINUOUS RECEPTION CONFIGURATION

FIELD OF TECHNOLOGY

The following relates to wireless communications, including beam specific idle discontinuous reception configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam specific idle discontinuous reception (I-DRX) configuration. For example, the described techniques provide for management of I-DRX configurations on a per beam or a per subset of beams basis. In some examples, the network may indicate, via system information, the I-DRX configuration for a given beam or subset of beams. A user equipment (UE) in an idle mode may receive paging occasions via the given beam in accordance with the indicated I-DRX configuration for that beam. In some examples, system information may indicate a list of beams and corresponding I-DRX configurations for each beam in the list of beams. In some examples, system information may indicate the I-DRX configuration for the beam on which the system information is transmitted. In such examples, if a UE changes beams, the UE may receive system information via the new beam that indicates an I-DRX configuration for the new beam before applying the I-DRX configuration to the new beam.

A method for wireless communications at a UE is described. The method may include receiving, from a network entity via a beam, a system information message indicating an I-DRX configuration specific to the beam and receiving, from the network entity via the beam while the UE is operating in an idle mode, a paging occasion in accordance with the I-DRX configuration specific to the beam.

An apparatus for wireless communications at a UE is described. The apparatus may include a processor, memory coupled with the processor, and instructions stored in the memory. The instructions may be executable by the processor to cause the apparatus to receive, from a network entity via a beam, a system information message indicating an I-DRX configuration specific to the beam and receive, from the network entity via the beam while the UE is operating in an idle mode, a paging occasion in accordance with the I-DRX configuration specific to the beam.

Another apparatus for wireless communications at a UE is described. The apparatus may include means for receiving, from a network entity via a beam, a system information message indicating an I-DRX configuration specific to the beam and means for receiving, from the network entity via the beam while the UE is operating in an idle mode, a paging occasion in accordance with the I-DRX configuration specific to the beam.

A non-transitory computer-readable medium storing code for wireless communications at a UE is described. The code may include instructions executable by a processor to receive, from a network entity via a beam, a system information message indicating an I-DRX configuration specific to the beam and receive, from the network entity via the beam while the UE is operating in an idle mode, a paging occasion in accordance with the I-DRX configuration specific to the beam.

In some examples of the method, apparatuses, and non-transitory computer-readable medium described herein, receiving the system information message may include operations, features, means, or instructions for receiving an indication of a respective I-DRX configuration specific to each beam of the set of multiple beams.

Some examples of the method, apparatuses, and non-transitory computer-readable medium described herein may further include operations, features, means, or instructions for receiving, from the network entity via a second beam while the UE may be operating in the idle mode, a second paging occasion in accordance with the respective I-DRX configuration specific to the second beam.

In some examples of the method, apparatuses, and non-transitory computer-readable medium described herein, the paging occasion may be offset in time from the second paging occasion by a time period corresponding to a random access channel procedure.

Some examples of the method, apparatuses, and non-transitory computer-readable medium described herein may further include operations, features, means, or instructions for receiving, from the network entity and after the system information message, a paging error indication message indicating a subset of beams of the set of multiple beams and receiving, from the network entity via the subset of beams while the UE may be operating in the idle mode, one or more paging occasions in accordance with respective I-DRX configurations specific to the subset of beams.

Some examples of the method, apparatuses, and non-transitory computer-readable medium described herein may further include operations, features, means, or instructions for receiving, from the network entity via a second beam, a second system information message indicating a second I-DRX configuration specific to the second beam and receiving, from the network entity via the second beam while the UE may be operating in the idle mode, a second paging occasion in accordance with the I-DRX configuration specific to the second beam.

Some examples of the method, apparatuses, and non-transitory computer-readable medium described herein may further include operations, features, means, or instructions for receiving, from the network entity and after the system information message, a paging error indication message indicating one or more updated parameters for the I-DRX configuration specific to the beam, where the paging occasion may be received in accordance with the one or more updated parameters.

Some examples of the method, apparatuses, and non-transitory computer-readable medium described herein may further include operations, features, means, or instructions for performing a random access channel procedure with the network entity using the beam based on the paging occasion.

In some examples of the method, apparatuses, and non-transitory computer-readable medium described herein, receiving the system information message indicating the I-DRX configuration specific to the beam may include operations, features, means, or instructions for receiving the system information message indicating the I-DRX configuration may be associated with one of a transmission and reception point associated with the beam or a set of beams including the beam.

In some examples of the method, apparatuses, and non-transitory computer-readable medium described herein, the I-DRX configuration includes a cycle duration, a paging frame location, and a number of paging occasions per cycle duration.

A method for wireless communications at a network entity is described. The method may include transmitting, via a beam, a system information message indicating an I-DRX configuration specific to the beam and transmitting, to a UE via the beam while the UE is operating in an idle mode, a paging occasion in accordance with the I-DRX configuration specific to the beam.

An apparatus for wireless communications at a network entity is described. The apparatus may include a processor, memory coupled with the processor, and instructions stored in the memory. The instructions may be executable by the processor to cause the apparatus to transmit, via a beam, a system information message indicating an I-DRX configuration specific to the beam and transmit, to a UE via the beam while the UE is operating in an idle mode, a paging occasion in accordance with the I-DRX configuration specific to the beam.

Another apparatus for wireless communications at a network entity is described. The apparatus may include means for transmitting, via a beam, a system information message indicating an I-DRX configuration specific to the beam and means for transmitting, to a UE via the beam while the UE is operating in an idle mode, a paging occasion in accordance with the I-DRX configuration specific to the beam.

A non-transitory computer-readable medium storing code for wireless communications at a network entity is described. The code may include instructions executable by a processor to transmit, via a beam, a system information message indicating an I-DRX configuration specific to the beam and transmit, to a UE via the beam while the UE is operating in an idle mode, a paging occasion in accordance with the I-DRX configuration specific to the beam.

In some examples of the method, apparatuses, and non-transitory computer-readable medium described herein, transmitting the system information message may include operations, features, means, or instructions for transmitting an indication of a respective I-DRX configuration specific to each beam of the set of multiple beams.

Some examples of the method, apparatuses, and non-transitory computer-readable medium described herein may further include operations, features, means, or instructions for transmitting, to the UE via a second beam while the UE may be operating in the idle mode, a second paging occasion in accordance with the respective I-DRX configuration specific to the second beam.

In some examples of the method, apparatuses, and non-transitory computer-readable medium described herein, the paging occasion may be offset in time from the second paging occasion by a time period corresponding to a random access channel procedure.

Some examples of the method, apparatuses, and non-transitory computer-readable medium described herein may further include operations, features, means, or instructions for transmitting, to the UE and after the system information message, a paging error indication message indicating a subset of beams of the set of multiple beams and transmitting, to the UE via the subset of beams while the UE may be operating in the idle mode, one or more paging occasions in accordance with respective I-DRX configurations specific to the subset of beams.

Some examples of the method, apparatuses, and non-transitory computer-readable medium described herein may further include operations, features, means, or instructions for transmitting, to the UE via a second beam, a second system information message indicating a second I-DRX configuration specific to the second beam and transmitting, to the UE via the second beam while the UE may be operating in the idle mode, a second paging occasion in accordance with the I-DRX configuration specific to the second beam.

Some examples of the method, apparatuses, and non-transitory computer-readable medium described herein may further include operations, features, means, or instructions for transmitting, to the UE and after the system information message, a paging error indication message indicating one or more updated parameters for the I-DRX configuration specific to the beam, where the paging occasion may be transmitted in accordance with the one or more updated parameters.

Some examples of the method, apparatuses, and non-transitory computer-readable medium described herein may further include operations, features, means, or instructions for performing a random access channel procedure with the UE using the beam based on the paging occasion.

In some examples of the method, apparatuses, and non-transitory computer-readable medium described herein, transmitting the system information message indicating the I-DRX configuration specific to the beam may include operations, features, means, or instructions for transmitting the system information message indicating the I-DRX configuration may be associated with one of a transmission and reception point associated with the beam or a set of beams including the beam.

In some examples of the method, apparatuses, and non-transitory computer-readable medium described herein, the I-DRX configuration includes a cycle duration, a paging frame location, and a number of paging occasions per cycle duration.

DETAILED DESCRIPTION

In some wireless communications systems, a cell may communicate with various user equipments (UE)s via a number of beams. UEs may be non-uniformly distributed, meaning that some beams may be used for communications with more UEs or for larger traffic loads than other beams. Uniform management of the beams, including, for example, uniform reference signal transmissions for the various beams, may lead to high energy consumption at the network side and under-utilization of system resources. As another example, an idle discontinuous reception (I-DRX) configuration may be applied to an entire cell. Applying the same I-DRX to every beam for a cell may be inefficient for a non-uniform distribution of UEs, as some beams may be associated with more active or idle UEs than other beams. For example, some beams may have higher traffic loads, and therefore less resources available to dedicate to paging occasions in I-DRX. The non-uniform distribution of UEs and traffic loads may change over time (e.g., over the course of a day).

Aspects of the present disclosure relate to management of I-DRX configurations on a per beam or a per subset of beams basis. In some examples, the network may indicate, via system information, the I-DRX configuration for a given beam or subset of beams. The UE may receive paging occasions via the given beam in accordance with the indicated I-DRX configuration for that beam. In some examples, system information may indicate a list of beams and corresponding I-DRX configurations for each beam in the list of beams. In some examples, system information may indicate the I-DRX configuration for the beam on which the system information is transmitted. In such examples, if a UE changes beams, the UE may receive system information via the new beam that indicates an I-DRX configuration for the new beam before applying the I-DRX configuration to the new beam. Within an I-DRX cycle, the paging occasions for different beams may be spaced such that a UE has time to perform a random access (RACH) procedure using a first beam in response to a first paging occasion on the first beam before receiving a second paging occasion on a second beam. For example, if the RACH procedure on the first beam fails, the UE may receive a paging occasion on a second beam within a same I-DRX cycle. As system information may be semi-static, in some examples, the network entity may indicate dynamic updates to the I-DRX configurations for one or more beams via paging error indication messages.

Aspects of the disclosure are initially described in the context of wireless communications systems. Aspects of the disclosure are further illustrated by and described with reference to network architectures, paging schemes, resource diagrams, and process flows. Aspects of the disclosure are further illustrated by and described with reference to apparatus diagrams, system diagrams, and flowcharts that relate to beam specific I-DRX configuration.

Figure 1:
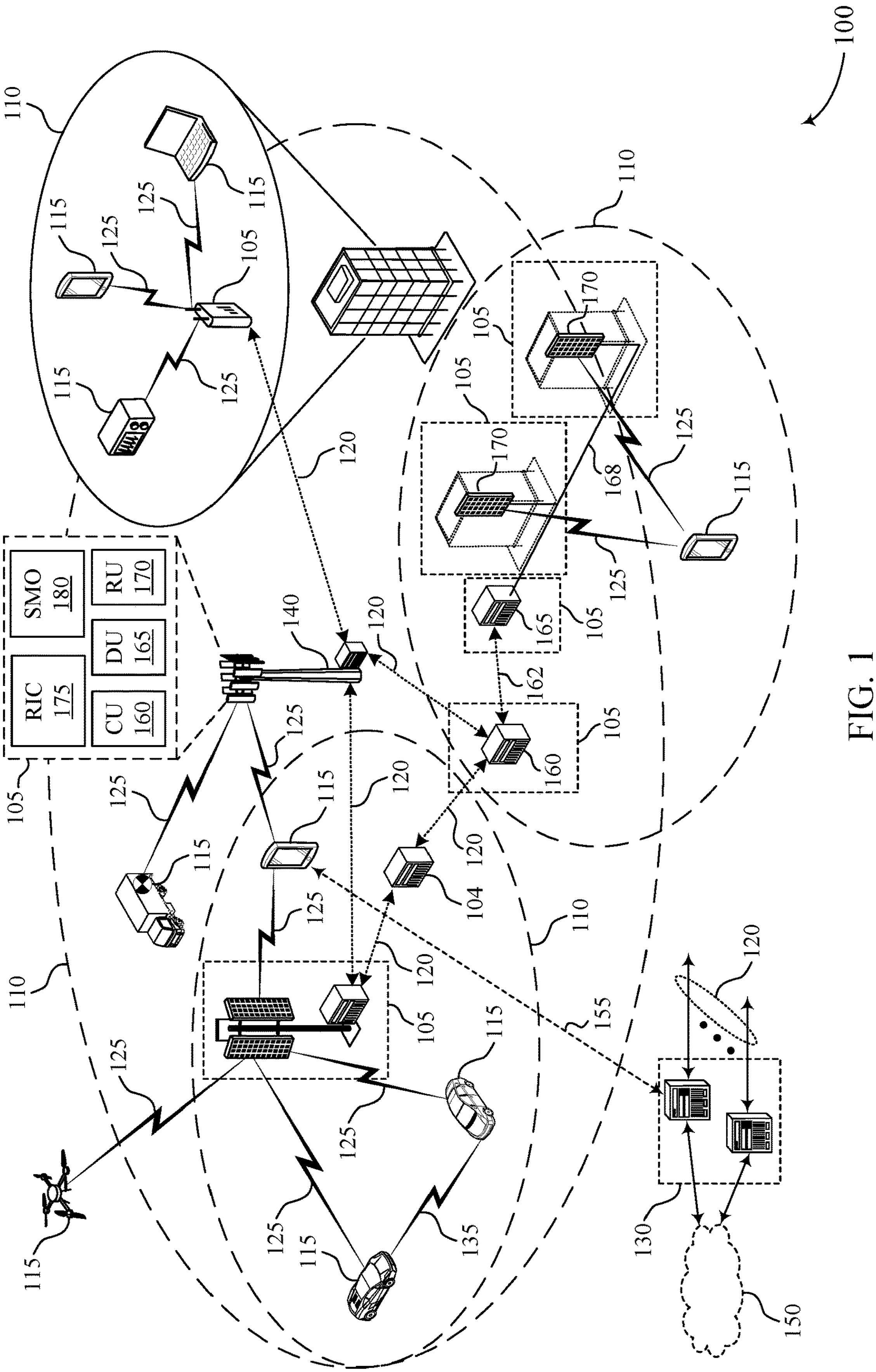
FIG. 1 illustrates an example of a wireless communications system that supports beam specific idle discontinuous reception (I-DRX) configuration in accordance with one or more aspects of the present disclosure.

FIG. 1 illustrates an example of a wireless communications system 100 that supports beam specific I-DRX configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam specific I-DRX configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$, may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some network entities 105 may implement network energy saving techniques (e.g., in the context of self-organizing networks (SON)s and/or minimization of drive test (MDT)). For example, the network may coordinate signaling to turn off or on some cells for power saving purposes. In some examples, a cell that is not serving any UEs 115 may enter an energy saving mode, and the cell may use varying approaches for tradeoff between energy saving and connection latency. Some example techniques for increasing time domain energy saving opportunities at a network entity include reducing or adapting transmission and/or reception of common channels/signals (e.g., synchronization signal block (SSB), system information block (SIB) 1, other system information, or signals for paging, physical random access channel (PRACH), initial access procedures, cell (re)selection, handover, and synchronization and measurements performed by an idle/active/connected UE 115). Methods of reducing transmission/reception of common channels/signals may include no-transmission/reception or reduced-transmission/reception, increased periodicity, enabling of on-demand transmission/reception of common channels/signals, or offloading of common channels/signals to other carriers or use of light or relaxed versions of common channels/signals.

Additional or alternative example techniques for increasing time domain energy saving opportunities at a network entity may include methods of reducing or adapting transmission/reception of periodic and semi-persistent signals and channel configurations such as channel state information (CSI) reference signal (CSI-RS), group-common/UE-specific physical downlink control channel (PDCCH), semi-persistent scheduled (SPS) physical downlink shared channel (PDSCH), physical uplink control channel (PUCCH) carrying a scheduling request (SR), PUCCH or physical uplink shared channel (PUSCH) carrying CSI reports, PUCCH carrying HARQ acknowledgement for SPS, configured grant (CG) PUSCH, sounding reference signal (SRS), or positioning reference signal (PRS). Additional or alternative example techniques for increasing time domain energy saving opportunities at a network entity include turning a semi-static and/or dynamic cell on or off in one or more granularities (e.g., subframe, slot, or symbol). For example, a cell or network node activation request from a UE 115 may trigger semi-static and/or dynamic cells to turn on or off. In some examples, enhancements to layer one or layer two signaling may be made based on mobility to efficiently enable a network node (e.g., a TRP or repeater) to turn on or off within a cell. In some examples, signaling enhancements for indication of semi-static and/or dynamic cell/subframe/slot/symbol on/off may be used to save power at the network side.

Additional or alternative example techniques for increasing time domain energy saving opportunities at a network entity may include support of periodic and/or on/demand reference signal(s) from a network entity 105 to aid in discovery of a cell. Additional or alternative example techniques for increasing time domain energy saving opportunities at a network entity may include dynamic adaptation of connected mode discontinuous reception (C-DRX) configurations in a UE-group or cell-specific manner. Additional or alternative example techniques for increasing time domain energy saving opportunities at a network entity may include mechanisms to utilize potential energy saving states or sleep modes and the transition between states from leveraging on/off opportunities. For example, a network entity 105 may be woken up due to user traffic, user density, or reception of a wake up signal. In some examples, discovery and measurements of cells may be performed by a network entity 105 in sleep or dormant states. Additional or alternative example techniques for increasing time domain energy saving opportunities at a network entity may include UE 115 assistant information facilitating base station time domain adaptation.

UEs 115 may be non-uniformly distributed in a cell (e.g., within a coverage area 110), meaning that some beams may be used for communications with more UEs 115 or for larger traffic loads than other beams. For example, non-uniform distribution may occur due to UE drop, traffic types, differing quality of service (QoS) demands for different UEs 115, differing UE types, and differing traffic loads between UEs 115. Uniform management of the beams, including, for example, uniform reference signal transmissions for the various beams, may lead to high energy consumption at a network entity 105 and under-utilization of system resources. As another example, an I-DRX configuration may be configured for an entire cell. Applying the same I-DRX to every beam for a cell may be inefficient for a non-uniform distribution of UEs 115, as some beams may be associated with more active mode UEs 115 or idle mode UEs 115 than other beams. For example, some beams may have higher traffic loads, and therefore less resources available to dedicate to paging occasions in I-DRX. The non-uniform distribution of UEs 115 and traffic loads may change over time (e.g., over the course of a day).

Accordingly, the wireless communications system 100 may manage I-DRX configurations on a per beam or a per subset of beams basis. In some examples, a network entity 105 may indicate, via system information, the I-DRX configuration for a given beam or subset of beams. The UE 115 may receive paging occasions via the given beam in accordance with the indicated I-DRX configuration for that beam. In some examples, system information may indicate a list of beams and corresponding I-DRX configurations for each beam in the list of beams. In some examples, system information may indicate the I-DRX configuration for the beam on which the system information is transmitted. In such examples, if a UE changes beams, the UE 115 may receive system information via the new beam that indicates an I-DRX configuration for the new beam before applying the I-DRX configuration to the new beam. Within an I-DRX cycle, the paging occasions for different beams may be spaced such that a UE has time to perform a RACH procedure (e.g., transmit a PRACH on a RACH occasion) using a first beam in response to a first paging occasion on the first beam before receiving a second paging occasion on a second beam. For example, if the RACH procedure on the first beam fails, the UE 115 may receive a paging occasion on a second beam within a same I-DRX cycle. As system information may be semi-static, in some examples, the network entity may indicate dynamic updates to the I-DRX configurations for one or more beams via paging error indication messages.

Figure 2:
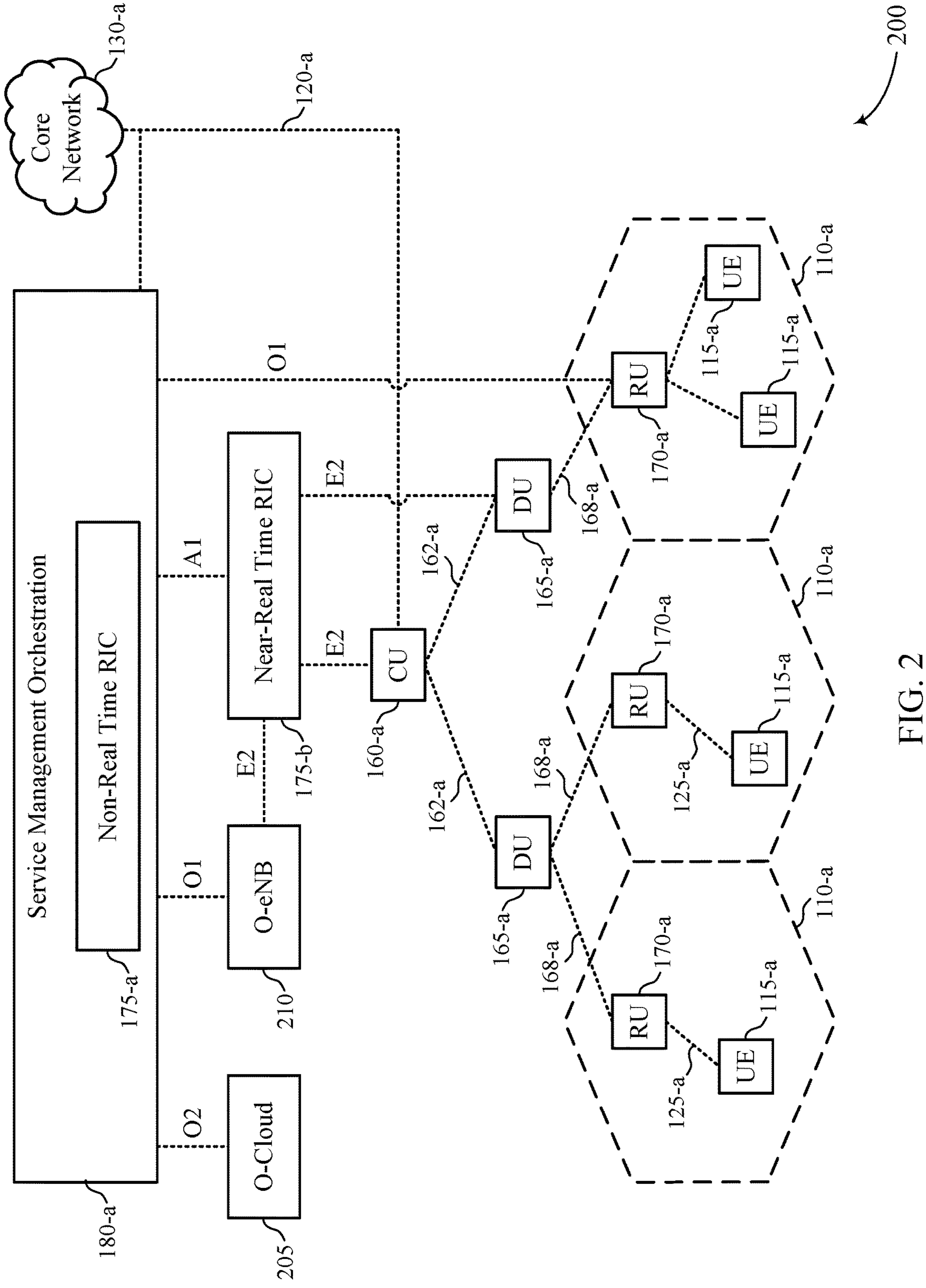
FIG. 2 illustrates an example of a network architecture that supports beam specific I-DRX configuration in accordance with one or more aspects of the present disclosure.

FIG. 2 illustrates an example of a network architecture 200 (e.g., a disaggregated base station architecture, a disaggregated RAN architecture) that supports beam specific I-DRX configuration in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, PRACH extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
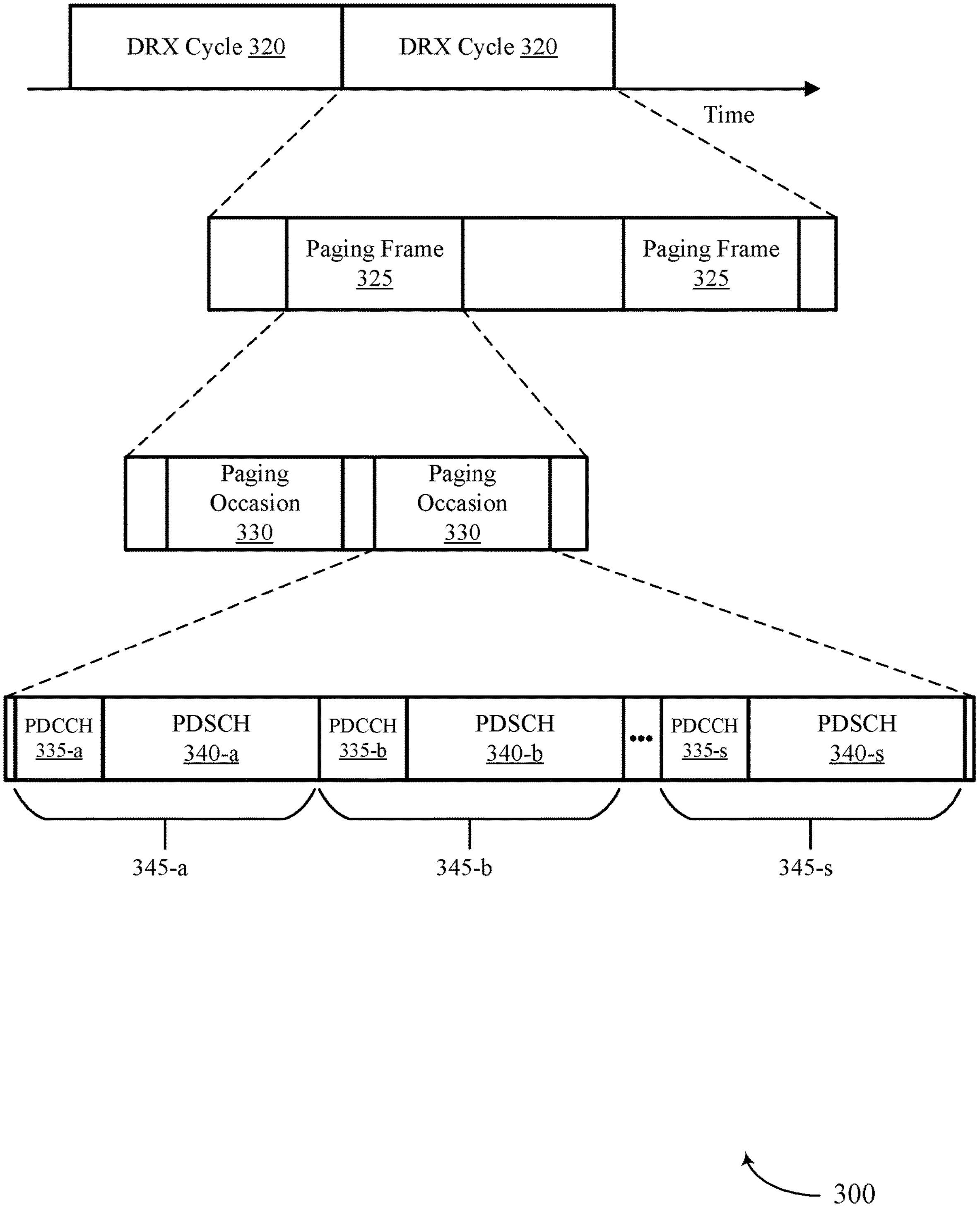
FIG. 3 illustrates an example of a paging scheme that supports beam specific I-DRX configuration in accordance with one or more aspects of the present disclosure.

FIG. 3 illustrates an example of a paging scheme 300 that supports beam specific I-DRX configuration in accordance with one or more aspects of the present disclosure. In some aspects, the paging scheme 300 may implement aspects of wireless communications systems 100.

In some examples, a wireless communications system may operate using a I-DRX cycle, such as the I-DRX cycle 320. A paging frame 325 may be included in one or more portions of the I-DRX cycle 320. The paging frame 325, in turn, may include one or more paging occasions 330 during which a network entity 105 may transmit paging messages 345 in a number of directions s. For example, a network entity 105 may be configured to transmit s SSBs in s directions. The network entity 105 may be configured to transmit s paging messages in the s directions. Each paging message 345 may span a slot, and may include a PDCCH portion 335 (e.g., that spans 2 symbols) and a PDSCH portion 340 (e.g., that spans 12 symbols). For example, a first paging message 345-*a* may include a PDCCH portion 335-*a* and a PDSCH portion 340-*a* and may be transmitted in a first direction (e.g., using a first beam). A second paging message 345-*b* a may include a PDCCH portion 335-*b* and a PDSCH portion 340-*b* and may be transmitted in a second direction (e.g., using a second beam). Another paging message 345-*s* may include a PDCCH portion 335-*s* and a PDSCH portion 340-*s* and may be transmitted in another direction (e.g., using a another beam). If each PDCCH portion 335 includes 2 symbols, and each PDSCH portion 340 includes 12 symbols, and s=32, then the duration of a paging occasion 330 is equal to 4 milliseconds.

During an I-DRX cycle 320, an idle/inactive UE 115 may process a quantity (e.g., n) of SSB bursts prior to the paging occasion 330. The UE 115 may then wakeup at its paging occasion to monitor for and process a paging message (if any). For example, in some cases, n may be less than or equal to 3. In some cases, n may depend on the signal to interference and noise ratio (SINR) at the UE 115. In some examples, all of the beams for a same cell may share a common I-DRX configuration. Accordingly, in some examples, in multi-beam operations, the UE 115 may assume that the same paging message 345 and the same short messages are repeated in each of the beams.

In some examples, the network entity 105 may transmit the paging message in all directions (e.g., in all s directions). However, if there are few UEs 115 that are to receive paging messages or the UEs are grouped in directions that are fewer than the total amount of directions available for use in transmissions by the network entity 105, the network entity 105 may expend less energy by transmitting fewer paging messages (e.g., in fewer directions via fewer beams).

In some examples, the network entity 105 may determine to transmit paging messages on a smaller number of beams to either free up resources or for network energy saving purposes. The UE 115 may assume that paging messages are transmitted on all beams of a cell in the absence of an indication from the network that the network entity is reducing the number of paging messages. The UE 115 may be configured to process SSBs on all directions before a paging occasion and then choosing the best beam based on SSB reference signal received power (RSRP) or SINR. In some cases, the network entity 105 may reduce the number of beams on which paging occasions are transmitted without indicating the reduction to the UE 115. In some examples, after transmitting the reduced number of paging occasions on the reduced number of beams, if the network entity 105 does not receive any response from the UE 115, the network entity may transmit the same paging message on all of the beams of the cell in the next cycle.

In some cases, if a UE 115 is in the coverage area of two beams, and in the current cycle the UE 115 is paged, then the UE 115 may choose to monitor its paging occasion on one of the two beams. If in the current paging cycle the network entity 105 determines to transmit a paging message for the UE 115 on only the other beam, the network entity 105 may end up transmitting three paging messages on the two beams in two I-DRX cycles (e.g., one on the second beam in the first cycle and then two paging messages on the two beams in both cycles). This may increase the paging messages as compared to transmitting a paging occasion on each beam in each I-DRX cycle. Accordingly, a paging scheme that first reduces the number of beams on which paging messages are transmitted and then transmits paging messages on all beams if no response is received may lead to higher network power consumption (e.g., one paging message is transmitted multiple times), lower system capacity (e.g., because as a paging message is transmitted more times, more resources are used for the paging message), higher UE latency (e.g., the UE may wait an additional I-DRX cycle to receive a paging message), higher UE power consumption for the paged UE (e.g., the UE monitors one more paging occasion to receive the paging message), and higher UE power consumption for unpaged UEs (e.g., other UEs may monitor for an decode paging occasions not intended for the other UEs multiple times). Accordingly, in some examples, the network entity 105 may indicate to the UE(s) 115 which beams will or will not have paging occasions if the network entity 105 determines to reduce the number of beams on which paging occasions are transmitted.

Figure 4:
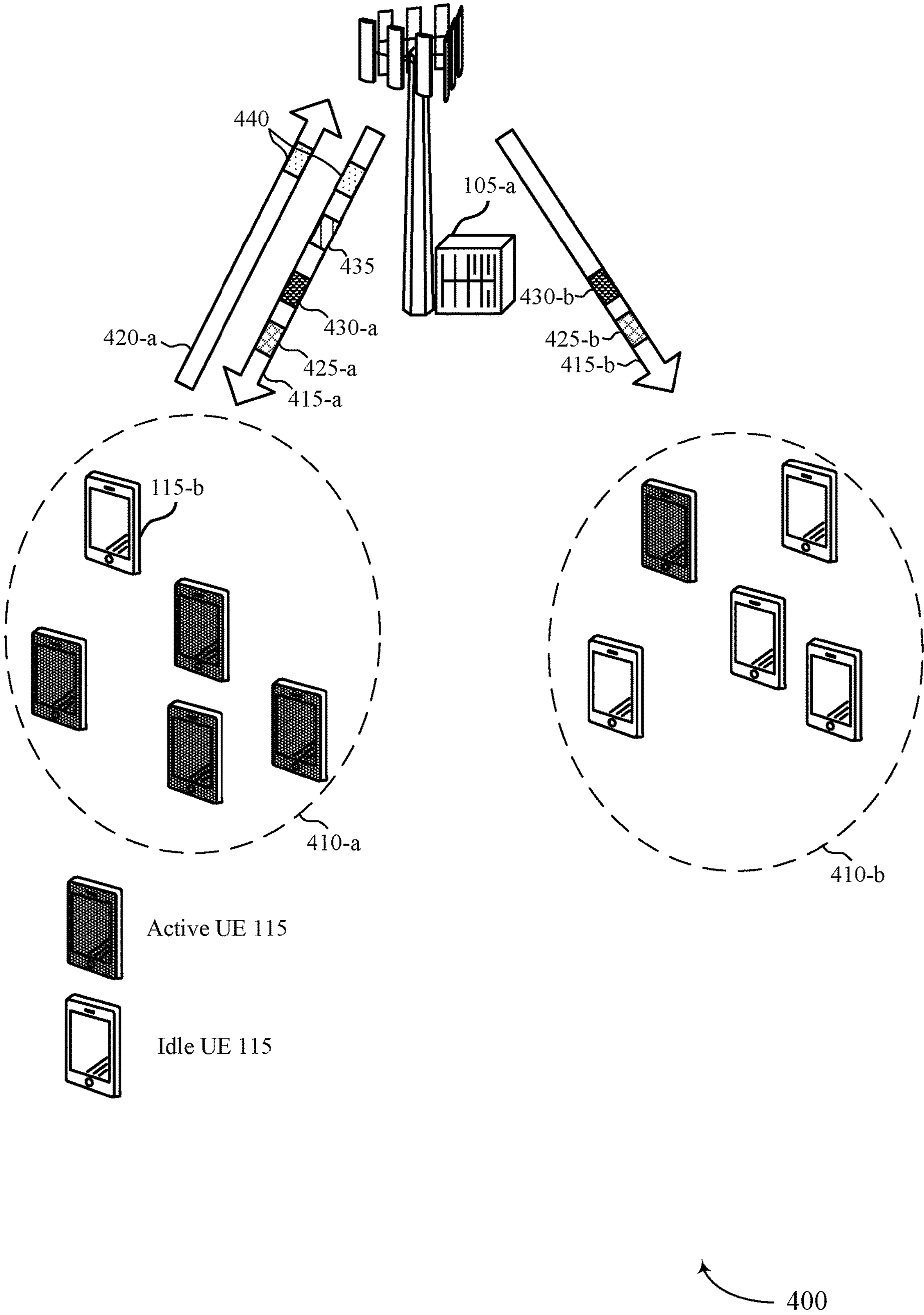
FIG. 4 illustrates an example of a wireless communications system that supports beam specific I-DRX configuration in accordance with one or more aspects of the present disclosure.

FIG. 4 illustrates an example of a wireless communications system 400 that supports beam specific I-DRX configuration in accordance with one or more aspects of the present disclosure. The wireless communications system 400 may include a UE 115-*b*, which may be an example of a UE 115 as described herein. The wireless communications system 400 may include a network entity 105-*a*, which may be an example of a network entity 105 as described herein.

The network entity 105-*a* may serve multiple UEs 115 in a geographic region via a given cell. The network entity may communicate with the various UEs 115 in the geographic region via multiple beams, including a first beam 415-*a* and a second beam 415-*b*. For example, the first beam 415-*a* may be used for communications with UEs 115 in a first sub-region 410-*a*, and the second beam 415-*b* may be used for communications with UEs 115 in a second sub-region 410-*b*. Some UEs 115 may be in a connected state and some UEs 115 may be in an idle or an inactive state. For example, FIG. 4 may show the wireless communications system 400 during the middle of the day, and the first sub-region 410-*a* may be a café and the second sub-region 410-*b* may be a residential building. The first sub-region 410-*a* may be served by a different TRP of the network entity 105-*a* than the second sub-region 410-*b*. During the middle of the day, an approximately equal number of UEs 115 may be located at the café and the residential building, but more UEs 115 at the café may be in the active state and more UEs 115 at the residential building may in the idle or inactive state (e.g., because UEs 115 at the residential building may be connected to a wireless local area network (WLAN) at the residential building).

As described herein, the network entity 105-*a* may transmit paging messages via paging occasions (e.g., paging occasions 430-*a* via the first beam 415-*a* and paging occasions 430-*b* via the second beam 415-*b*). The UE 115-*b* may perform a RACH procedure 440 with the network entity 105-*a* (e.g., via the first beam 415-*a* and a corresponding uplink beam 420-*a*) based on information received in a paging occasion 430-*a* via the first beam 415-*a* in order to connect with (e.g., enter a connected state) the network entity 105-*a*.

A paging load may refer to the average number of paging messages sent in a cell during one I-DRX cycle. The paging load may depend on the number of idle and inactive UEs 115 associated with the cell and the number of idle or inactive UEs associated with a neighboring cell. Paging overhead may refer to the number of resource elements (RE)s occupied for transmitting paging messages. If N is the number of idle or inactive UEs 115, p is the UE paging rate, nPO is the number of paging occasions per I-DRX cycle, x is the number of REs for one paging message, paging occasions are independent of each other, the UEs are distributed uniformly over paging occasions (e.g., each paging occasion has N/nPO number of idle or inactive UEs), and the I-DRX cycles are independent of each other (e.g., there is no leak from one cycle to another), the paging overhead in one beam of one cell due to idle or inactive cells is given by equation 1 below.

$$\sum_{i=1}^{nPO} ix\binom{nPO}{i}\left((1-p)^{\frac{N}{nPO}}\right)^{nPO-i}\left(1-(1-p)^{\frac{N}{nPO}}\right)^{i} = xnPo\left(1-(1-p)^{\frac{N}{nPO}}\right) \quad (1)$$

The network entity 105-*a* may be aware of the non-uniform distribution of active and idle mode UEs 115 between the first sub-region 410-*a* and the second sub-region 410-*b*. There may be three primary options to control I-DRX configurations semi-statically, including: (1) the number of paging occasions per cycle duration; (2) the paging frame place; and (3) the I-DRX cycle duration.

In a resource utilization scenario, shown in the wireless communications system 400, the number of connected UEs is non-uniform between the first sub-region 410-*a* and the second sub-region 410-*b*. The number of connected UEs 115 may be non-uniform across directions, and there may be fewer idle or inactive UEs 115 in congested directions. In a network energy saving scenario, shown in the wireless communications system 500 of FIG. 5, the paging load may be non-uniform between beams (e.g., the direction of a residential building may receive more paging messages that the direction of a café, and accordingly, most of the paging load would be directed toward the congested area with mode idle or inactive UEs 115).

The wireless communications system 400 (and the wireless communications system 500) may implement beam specific (e.g., per TRP) I-DRX configurations to account for non-uniform distribution of idle or inactive UEs 115. For example, the number of paging occasions per cycle or per paging frame, the paging frame place (e.g., timing offset), or the I-DRX cycle duration may be configured per beam or per TRP.

In the resource utilization scenario (e.g., overloaded scenario) of FIG. 4, the network entity 105-*a* is loaded, both with a data traffic load and a paging load. The paging load may be due to idle or inactive UEs 115 or UEs 115 associated with neighboring cells. The data traffic load and padding load may be nonuniformly distributed across the beams (e.g., across the first beam 415-*a* and the second beam 415-*b*). The paging load may not cause a high data traffic load (e.g., idle or inactive UEs 115 may be paged for low-load traffic such as interference management). In an example, scenario, N is the number of idle or inactive UEs and is equal to 100, and p is the UE paging rate and is equal to 0.01. The paging overhead with 2 paging occasions is then 0.79x, and the paging overhead with 1 paging occasion is then 0.63x. Accordingly, for the example scenario, 16% of the time the network entity 105-*a* would transmit paging messages in both paging occasions via the first beam 415-*a*.

The traffic load on the first beam 415-*a* may be such that the network may not be able to afford having two paging occasions on the first beam 415-*a*. If one paging occasion is used instead of two paging occasions for the first beam 415-*a*, then higher UE power consumption may occur. For example, the total normalized UE power consumption (e.g., with reference to the power consumption for a deep sleep mode) for one paging occasion may be 6321, and the total normalized power consumption with 2 paging occasions may be 6315. Further, a single paging occasion may cause a leak to subsequent I-DRX cycles which may effectively increase the group paging rate.

To implement beam specific (e.g., or TRP-specific) I-DRX configuration, the network entity 105-*a* may transmit system information via each beam indicating the I-DRX configuration for that beam. For example, the network entity 105-*a* may transmit system information 425-*a* via the first beam 415-*a* that indicates the I-DRX configuration for the first beam 415-*a* and the network entity 105-*a* may transmit system information 425-*b* via second beam 415-*b* that indicates the I-DRX configuration for the second beam 415-*b*. In some cases, the system information sent in association with different beams may have different content or sets of values. In some cases, the I-DRX configuration may be per beam. In some cases, the I-DRX configuration may be for a subset of beams of the set of beams for a cell. The system information may indicate which beams are included in the subset of beams.

In some cases, the system information (e.g., system information 425-*a*) transmitted via a beam (e.g., the first beam 415-*a*) may indicate only the I-DRX configuration for that beam (or the subset of beams including that beam). In some cases, if a UE 115-*b* needs to change beams (or TRPs), the UE 115-*b* may listen to system information (e.g., system information 425-*b*) on a new beam (e.g., the second beam 415-*b*) to determine the I-DRX configuration for the new beam. In some cases, short message indications may indicate the updated parameters or values for the I-DRX configuration for a new beam. Changing beams may be similar to a handover procedure. Changing beams may be simpler than a handover procedure, however, as most configurations between beams of a cell may be common (e.g., other than the I-DRX configuration) and beam changes may not include a window such as an SSB-based radio resource management (RRM) Measurement Timing Configuration (SMTC) window.

In some cases, the system information (e.g., system information 425-*a*) transmitted via a beam (e.g., the first beam 415-*a*) may include a list containing the I-DRX configuration for each beam (or subset of beams) associated with the cell. Accordingly, when changing beams, a UE 115-*b* may use the I-DRX information provided in the list in the system information 425. Transmitting an indication of the I-DRX configurations for each beam may increase overhead but reduce latency (e.g., since the UE 115-*b* does not need to wait for the system information (e.g., the system information 425-*b*) from the new beam (e.g., the second beam 415-*b*) in order to receive paging occasions (e.g., paging occasions 430-*b*) from the new beam.

In some cases, the network entity 105-*a* may dynamically indicate I-DRX configurations for given beams (e.g., the first beam 415-*a* or the second beam 415-*b*). For example, non-uniform patterns of demand (e.g., data traffic loads and paging loads) may change dynamically. For example, a moving relay (e.g., on a train or a bus with a mounted 5G relay) may be associated with a large number of UEs 115. As another example, a UE 115 or a group of UEs 115 with a high data traffic load outdoors may be prone to have their orientations change. System information (e.g., transmitted via system information 425-*a* or system information 425-*b*) may not be updated dynamically. Accordingly, in some examples, I-DRX configurations (or a subset of I-DRX configurations) may be indicated to UE(s) 115 before sending paging messages.

A paging error indication message 435 may indicate paging occasions to monitor and/or may indicate updates to configured I-DRX configurations. Before a paging message is transmitted, the network entity 105-*a* may transmit a paging error indication message 435 that indicates one of the I-DRX configurations, a subset of I-DRX configurations, or all of the I-DRX configurations for the cell. After receiving the paging error indication message 435, the UE 115-*b* may monitor the beam(s) indicated by the paging error indication message in accordance with the indicated I-DRX configurations. In some examples, a paging error indication message 435 may indicate updated parameters for an I-DRX configuration (e.g., (1) the number of paging occasions per cycle duration; (2) the paging frame place; and/or (3) the I-DRX cycle duration).

Figure 5:
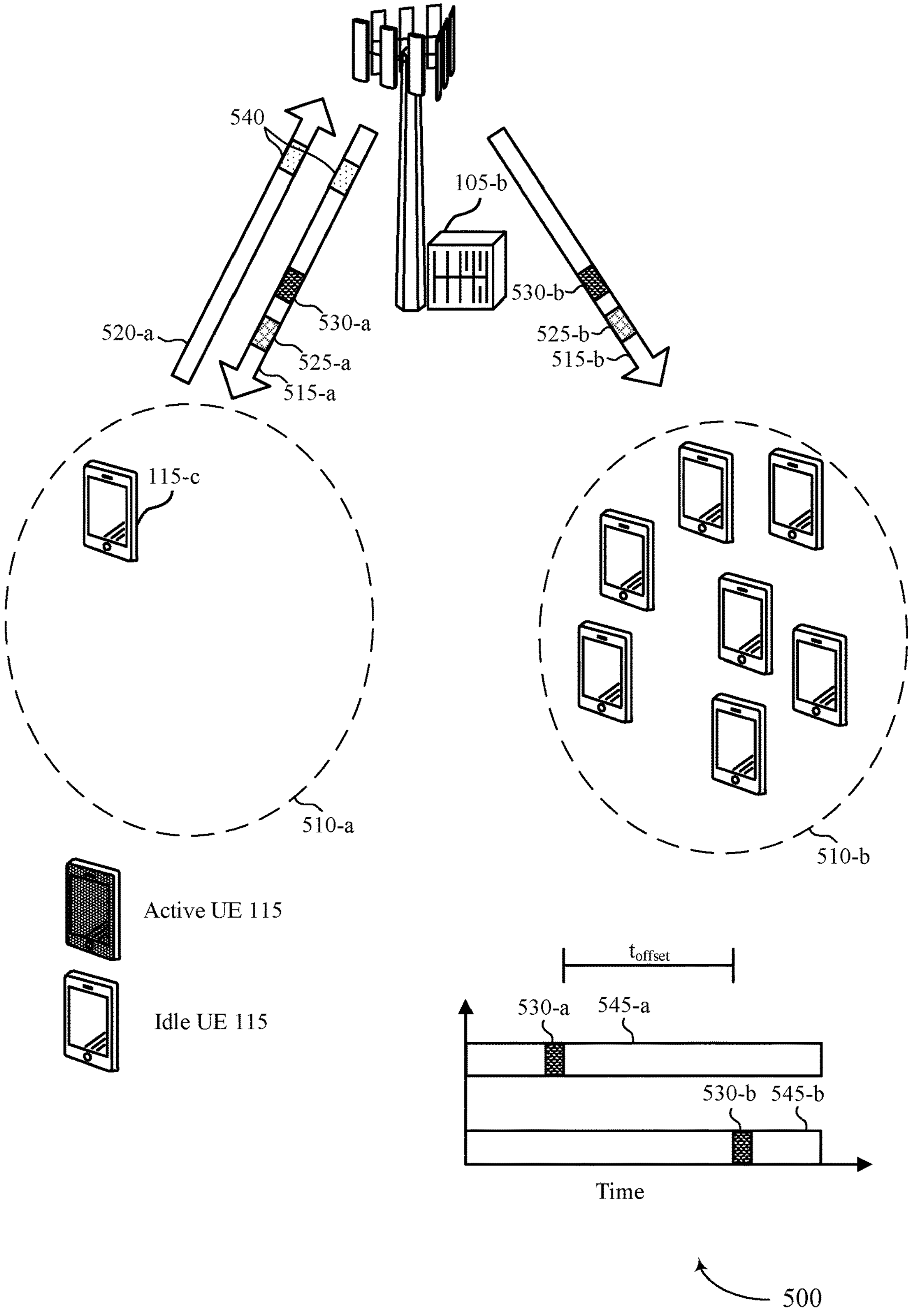
FIG. 5 illustrates an example of a wireless communications system that supports beam specific I-DRX configuration in accordance with one or more aspects of the present disclosure.

FIG. 5 illustrates an example of a wireless communications system 500 that supports beam specific I-DRX configuration in accordance with one or more aspects of the present disclosure. The wireless communications system 500 may include a UE 115-*c*, which may be an example of a UE 115 as described herein. The wireless communications system 500 may include a network entity 105-*b*, which may be an example of a network entity 105 as described herein.

The network entity 105-*b* may serve multiple UEs 115 in a geographic region via a given cell. The network entity may communicate with the various UEs 115 in the geographic region via multiple beams, including a first beam 515-*a* and a second beam 515-*b*. For example, the first beam 515-*a* may be used for communications with UEs 115 in a first sub-region 510-*a*, and the second beam 515-*b* may be used for communications with UEs 115 in a second sub-region 510-*b*. Some UEs 115 may be in a connected state and some UEs 115 may be in an idle or an inactive state. For example, FIG. 5 may show the wireless communications system 400 during the evening, and the first sub-region 510-*a* may be a café and the second sub-region 510-*b* may be a residential building. The first sub-region 510-*a* may be served by a different TRP of the network entity 105-*b* than the second sub-region 510-*b*. During the evening, more UEs 115 may be located at the residential building that the café, and the UEs 115 at the residential building may in the idle or inactive state (e.g., because UEs 115 at the residential building may be connected to a WLAN at the residential building).

As described herein, the network entity 105-*b* may transmit paging messages via paging occasions (e.g., paging occasions 530-*a* via the first beam 515-*a* and paging occasions 530-*b* via the second beam 515-*b*). The network entity 105-*b* may transmit system information 525-*a* via the first beam 515-*a* that indicates an I-DRX configuration for the first beam 515-*a*. The network entity 105-*b* may transmit system information 525-*b* via the second beam 515-*b* that indicates an I-DRX configuration for the second beam 515-*b*. The UE 115-*c* may perform a RACH procedure 540 with the network entity 105-*b* (e.g., via the first beam 515-*a* and a corresponding uplink beam 520-*a*) based on information received in a paging occasion 530-*a* via the first beam 515-*a*.

In a network energy saving scenario, shown in the wireless communications system 500 of FIG. 5, the paging load may be non-uniform between beams (e.g., the direction of a residential building may receive more paging messages that the direction of a café, and accordingly, most of the paging load would be directed toward the congested area with mode idle or inactive UEs 115). The paging load may not cause a high data traffic load (e.g., idle or inactive UEs 115 may be paged for low-load traffic such as interference management). The network entity 105-*b* may seek to transmit paging messages on a reduced number of beams in order to save power at the network entity 105-*b*.

In some cases, the network entity 105-*b* may transmit paging messages orderly in time (e.g., first only on the first beam 515-*a*, and then if no response, then on the second beam 515-*b*). Such an orderly in time procedure, however, may result in extra latency. For example, if T is the I-DRX cycle duration, using an orderly in time procedure may add an additional T latency to UEs on the second beam 515-*b*.

In some examples, to reduce latency, a gap ($t_{offset}$) may be configured between a paging occasion 530-*a* of the I-DRX cycle 545-*a* of the first beam 515-*a* and a paging occasion 530-*b* of the I-DRX cycle 545-*b* of the second beam 515-*b*. The gap ($t_{offset}$) may be such that a UE 115-*c* that is paged may transmit and process the paging occasion 530-*a* on the first beam 515-*a* and transmit a PRACH message on a RACH occasion on the first beam 515-*a* (e.g., on an uplink beam 520-*a* corresponding to the first beam 515-*a*) before the next paging occasion 530-*b* on the second beam 515-*b*. Accordingly, the additional latency may be T/2 (as compared to receiving and processing the paging occasion 530-*a* and the paging occasion 530-*b* concurrently).

Figure 6:
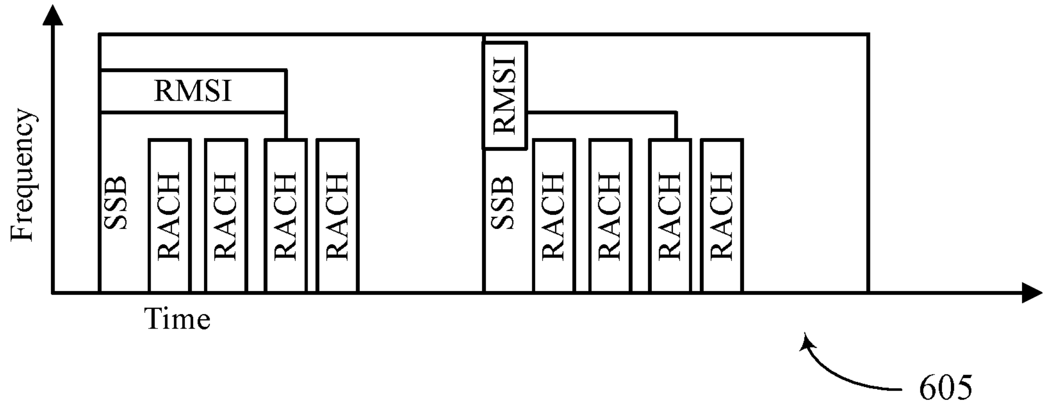
FIG. 6 illustrates an example of a resource diagram that supports beam specific I-DRX configuration in accordance with one or more aspects of the present disclosure.
Figure 6:
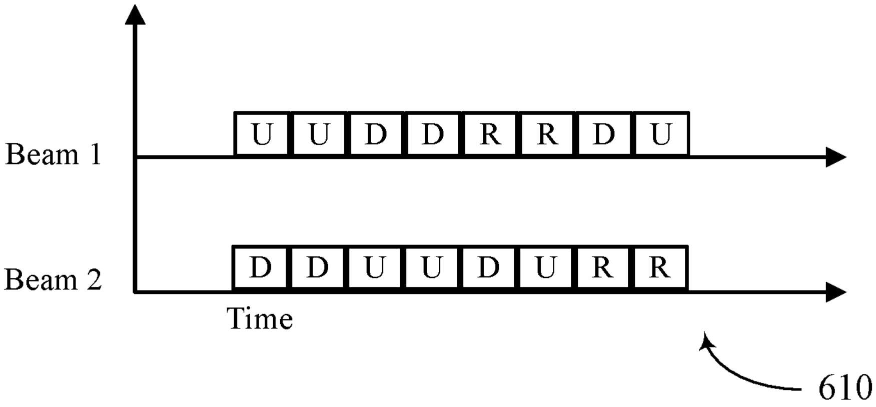
Figure 6:
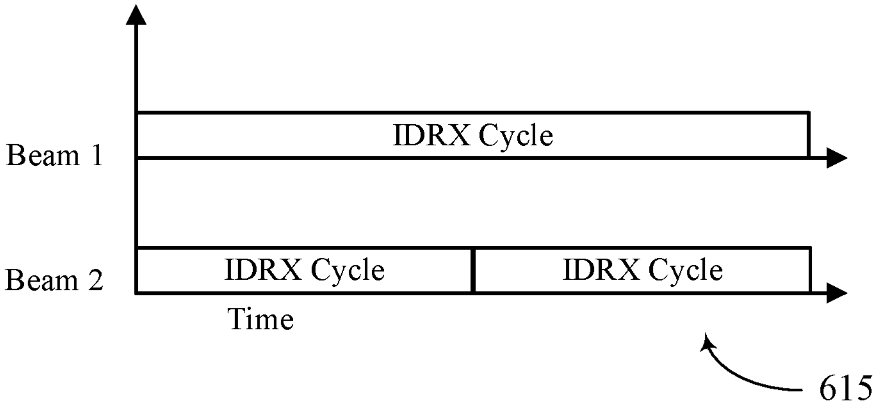

FIG. 6 illustrates an example of a resource diagram 600 that supports beam specific I-DRX configuration in accordance with one or more aspects of the present disclosure. In some aspects, the resource diagram 600 may implement aspects of the wireless communications system 100, the wireless communications system 400, or the wireless communications system 500.

As described herein, in some wireless communications systems, some system configurations may be defined on a cell-level. For example, SSB transmission power, the remaining minimum system information (RMSI) transmission resources, the periodicity of signals such as SSB, SSB to RACH occasion mapping, a TDD pattern, I-DRX configurations, beams to transmission paging message, access to network, parameters of cell selection or reselection, or whitelisting/blacklisting of cells for measurement objects may be configured on a per cell basis. In some cases, one or more of these system configurations may be configured on a per beam or per TRP basis.

For example, resource diagram 605 shows a configuration where the RMSI resources for one beam of a cell are different from the RMSI resources of another beam of the cell. As another example, resource diagram 610 shows a configuration where the TDD pattern for one beam of a cell is different from the TDD pattern of another beam of the cell. As another example, resource diagram 615 shows a configuration where the I-DRX cycle length for one beam of a cell is different from the I-DRX cycle length of another beam of the cell.

Figure 7:
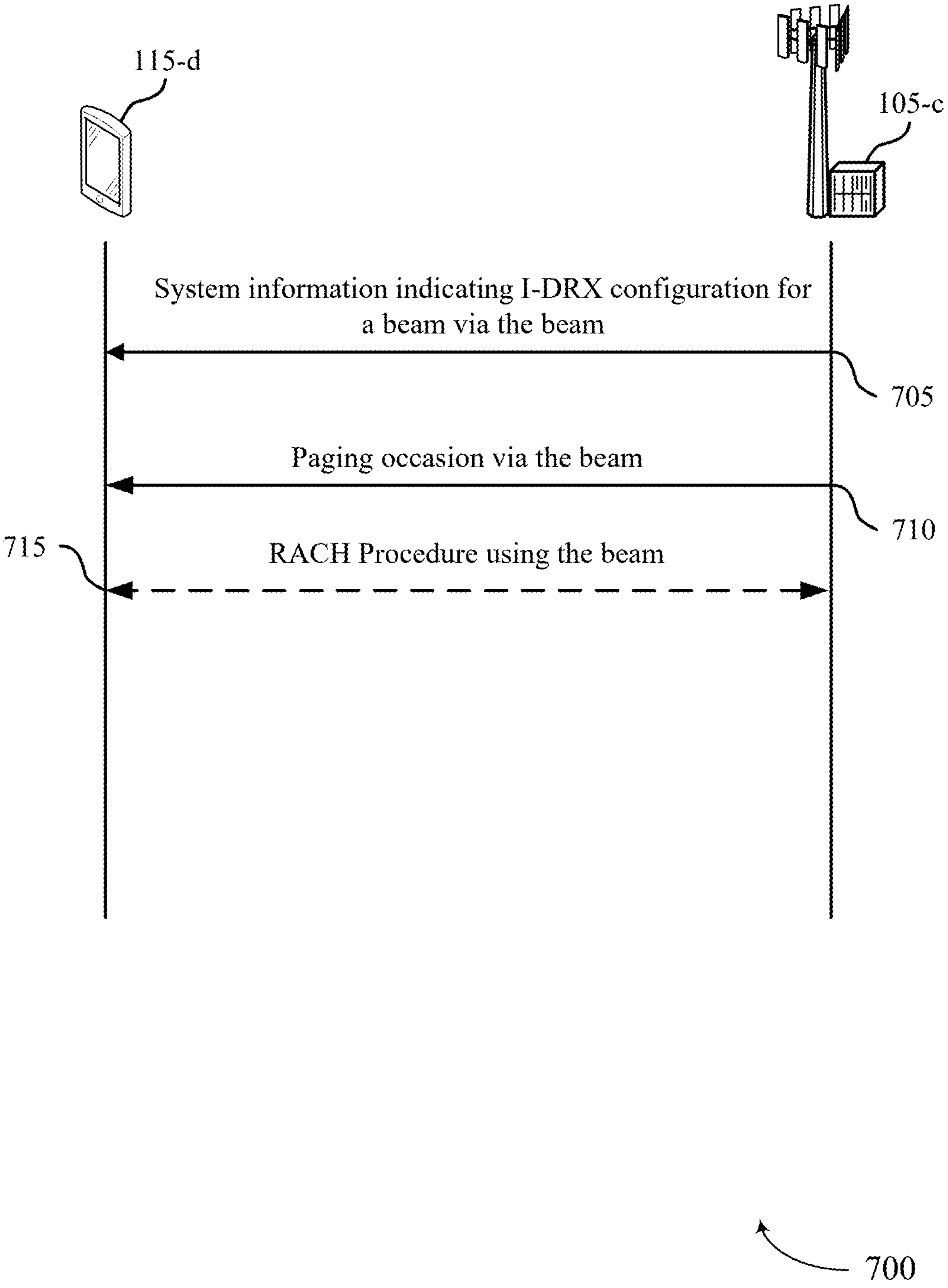
FIG. 7 illustrates an example of a process flow that supports beam specific I-DRX configuration in accordance with one or more aspects of the present disclosure.

FIG. 7 illustrates an example of a process flow 700 that supports beam specific I-DRX configuration in accordance with one or more aspects of the present disclosure. The process flow 700 may include a UE 115-*d*, which may be an example of a UE 115 as described herein. The process flow 700 may include a network entity 105-*c*, which may be an example of a network entity 105 as described herein. In the following description of the process flow 700, the operations between the network entity 105-*c* and the UE 115-*d* may be transmitted in a different order than the example order shown, or the operations performed by the network entity 105-*c* and the UE 115-*d* may be performed in different orders or at different times. Some operations may also be omitted from the process flow 700, and other operations may be added to the process flow 700.

At 705, the UE 115-*d* may receive, from the network entity 105-*c* via a beam, a system information message indicating an I-DRX configuration specific to the beam.

At 710, the UE 115-*d* may receive, from the network entity 105-*c* via the beam while the UE 115-*d* is operating in an idle mode, a paging occasion in accordance with the I-DRX configuration specific to the beam.

In some examples, at 715, the UE 115-*d* may perform a RACH procedure with the network entity 105-*c* using the beam based on the paging occasion.

In some examples, where the beam is associated with a cell, and where the cell is associated with a set of multiple beams, the set of multiple beams including the beam, receiving the system information message includes receiving an indication of a respective I-DRX configuration specific to each beam of the set of multiple beams. In some examples, the UE 115-*d* may receive, from the network entity 105-*c* via a second beam while the UE 115-*d* is operating in the idle mode, a second paging occasion in accordance with the respective I-DRX configuration specific to the second beam. In some examples, the paging occasion is offset in time from the second paging occasion by a time period corresponding to a RACH procedure. In some examples, the UE 115-*d* may receive, from the network entity 105-*c* after the system information message, a paging error indication message indicating a subset of beams of the set of multiple beams. The UE 115-*d* may receive, from the network entity 105-*c* via the subset of beams while the UE 115-*d* is operating in an idle mode, one or more paging occasions in accordance with the respective I-DRX configurations specific to the subset of beams.

In some examples, the UE 115-*d* may receive, from the network entity 105-*c* via a second beam, a second system information message indicating a second I-DRX configuration specific to the second beam. The UE 115-*d* may receive, from the network entity 105-*c* via the second beam while the UE 115-*d* is operating in the idle mode, a second paging occasion in accordance with the I-DRX configuration specific to the second beam.

In some examples, the UE 115-*d* may receive, from the network entity 105-*c* after the system information message, a paging error indication message indicating one or more updated parameters for the I-DRX configuration specific to the beam, where the paging occasion is received in accordance with the one or more updated parameters.

In some examples, receiving the system information message indicating the I-DRX configuration specific to the beam includes receiving the system information message indicating the I-DRX configuration is associated with one of a TRP associated with the beam or a set of beams including the beam.

In some examples, the I-DRX configuration includes a cycle duration, a paging frame location, and a number of paging occasions per cycle duration.

Figure 8:
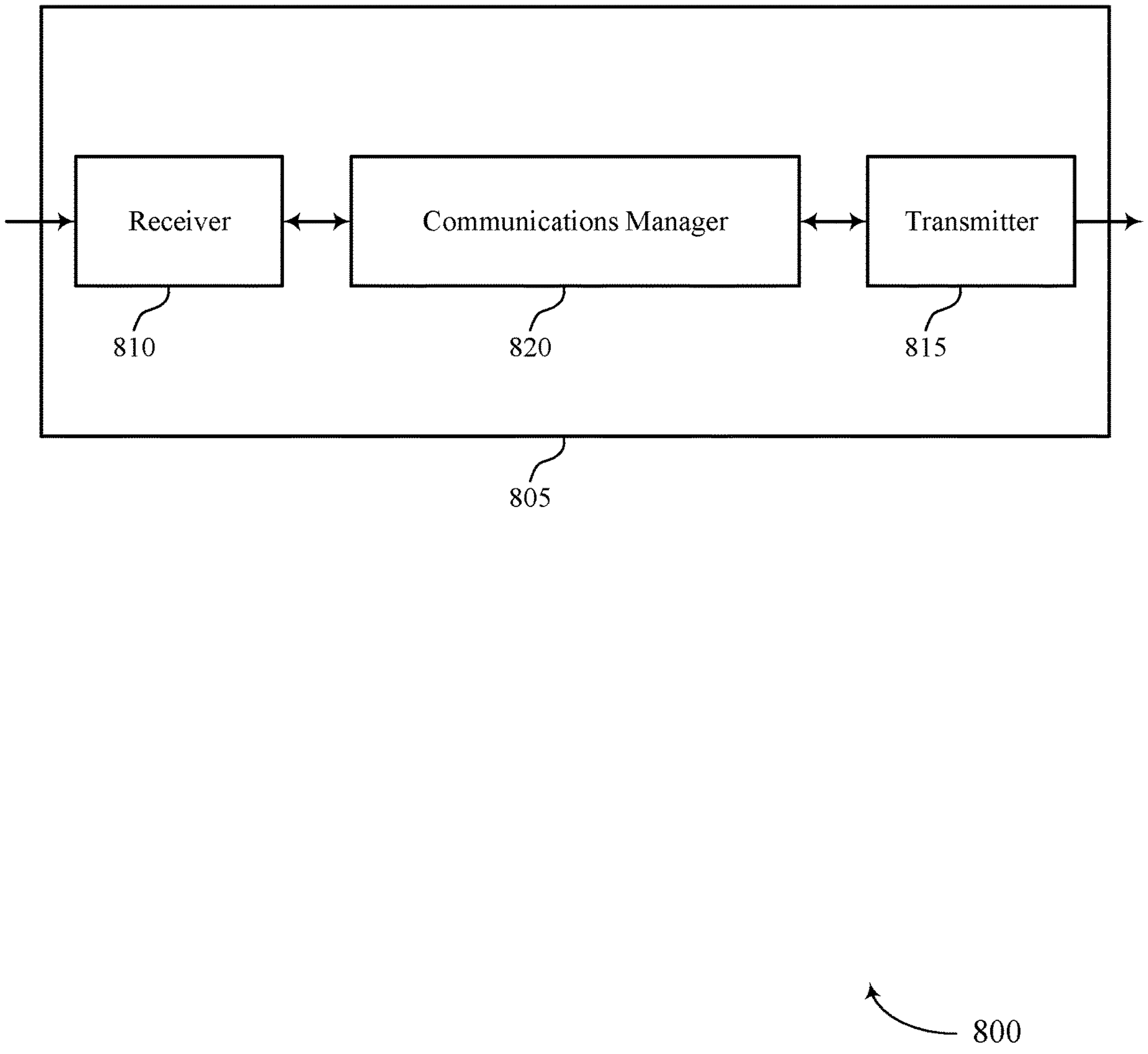
FIGS. 8 and 9 show block diagrams of devices that support beam specific I-DRX configuration in accordance with one or more aspects of the present disclosure.

FIG. 8 shows a block diagram 800 of a device 805 that supports beam specific I-DRX configuration in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to beam specific I-DRX configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam specific I-DRX configuration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of beam specific I-DRX configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving, from a network entity via a beam, a system information message indicating an I-DRX configuration specific to the beam. The communications manager 820 may be configured as or otherwise support a means for receiving, from the network entity via the beam while the UE is operating in an idle mode, a paging occasion in accordance with the I-DRX configuration specific to the beam.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and more efficient utilization of communication resources.

Figure 9:
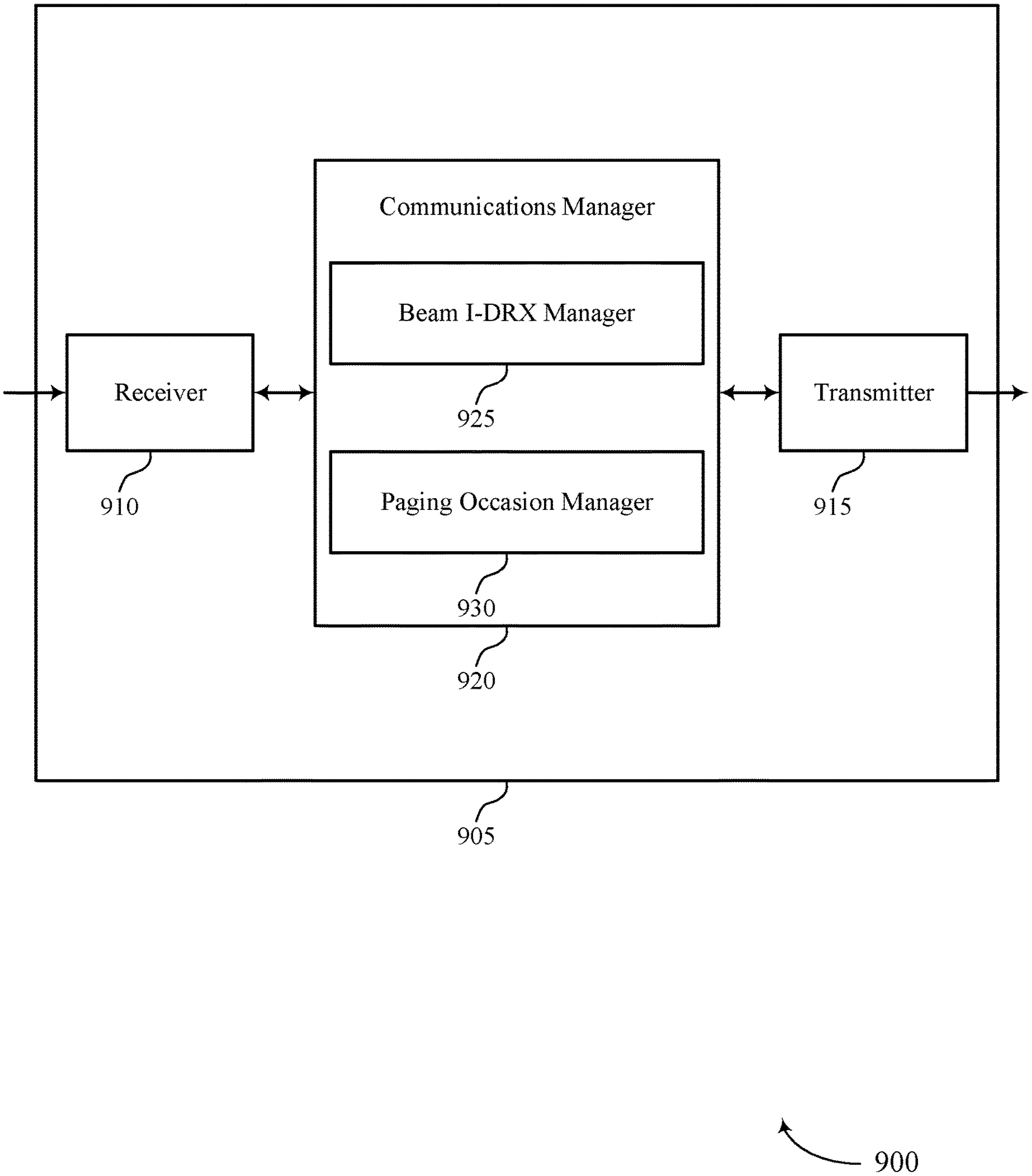

FIG. 9 shows a block diagram 900 of a device 905 that supports beam specific I-DRX configuration in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam specific I-DRX configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam specific I-DRX configuration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of beam specific I-DRX configuration as described herein. For example, the communications manager 920 may include a beam I-DRX manager 925 a paging occasion manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The beam I-DRX manager 925 may be configured as or otherwise support a means for receiving, from a network entity via a beam, a system information message indicating an I-DRX configuration specific to the beam. The paging occasion manager 930 may be configured as or otherwise support a means for receiving, from the network entity via the beam while the UE is operating in an idle mode, a paging occasion in accordance with the I-DRX configuration specific to the beam.

Figure 10:
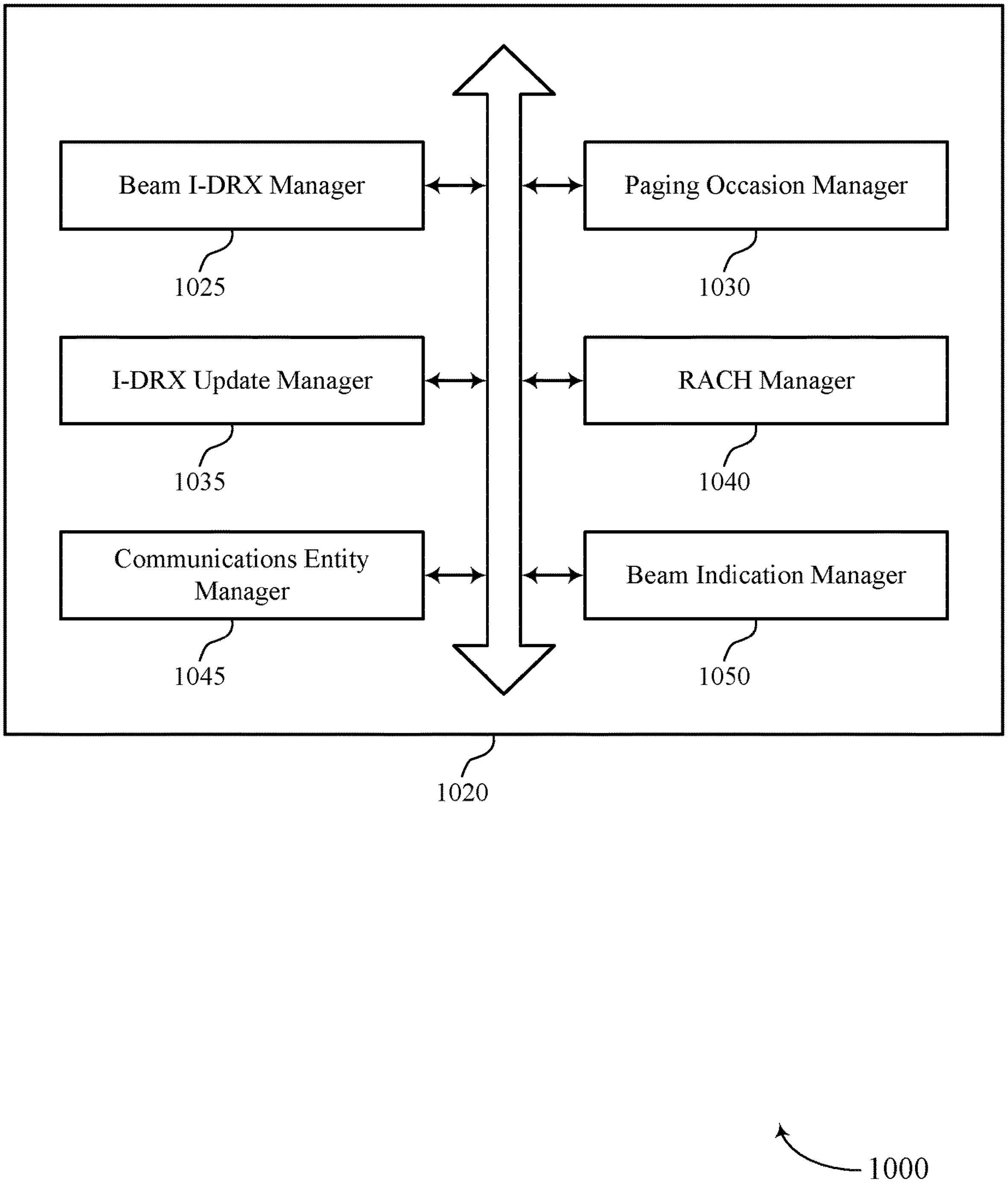
FIG. 10 shows a block diagram of a communications manager that supports beam specific I-DRX configuration in accordance with one or more aspects of the present disclosure.

FIG. 10 shows a block diagram 1000 of a communications manager 1020 that supports beam specific I-DRX configuration in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of beam specific I-DRX configuration as described herein. For example, the communications manager 1020 may include a beam I-DRX manager 1025, a paging occasion manager 1030, an I-DRX update manager 1035, a RACH manager 1040, a communications entity manager 1045, a beam indication manager 1050, or any combination thereof. Each of these components may communicate, directly or indirectly, with one another (e.g., via one or more buses).

The communications manager 1020 may support wireless communications at a UE in accordance with examples as disclosed herein. The beam I-DRX manager 1025 may be configured as or otherwise support a means for receiving, from a network entity via a beam, a system information message indicating an I-DRX configuration specific to the beam. The paging occasion manager 1030 may be configured as or otherwise support a means for receiving, from the network entity via the beam while the UE is operating in an idle mode, a paging occasion in accordance with the I-DRX configuration specific to the beam.

In some examples, to support receiving the system information message, the beam I-DRX manager 1025 may be configured as or otherwise support a means for receiving an indication of a respective I-DRX configuration specific to each beam of the set of multiple beams.

In some examples, the paging occasion manager 1030 may be configured as or otherwise support a means for receiving, from the network entity via a second beam while the UE is operating in the idle mode, a second paging occasion in accordance with the respective I-DRX configuration specific to the second beam.

In some examples, the paging occasion is offset in time from the second paging occasion by a time period corresponding to a RACH procedure.

In some examples, the beam indication manager 1050 may be configured as or otherwise support a means for receiving, from the network entity and after the system information message, a paging error indication message indicating a subset of beams of the set of multiple beams. In some examples, the paging occasion manager 1030 may be configured as or otherwise support a means for receiving, from the network entity via the subset of beams while the UE is operating in an idle mode, one or more paging occasions in accordance with the respective I-DRX configurations specific to the subset of beams.

In some examples, the beam I-DRX manager 1025 may be configured as or otherwise support a means for receiving, from the network entity via a second beam, a second system information message indicating a second I-DRX configuration specific to the second beam. In some examples, the paging occasion manager 1030 may be configured as or otherwise support a means for receiving, from the network entity via the second beam while the UE is operating in the idle mode, a second paging occasion in accordance with the I-DRX configuration specific to the second beam.

In some examples, the I-DRX update manager 1035 may be configured as or otherwise support a means for receiving, from the network entity and after the system information message, a paging error indication message indicating one or more updated parameters for the I-DRX configuration specific to the beam, where the paging occasion is received in accordance with the one or more updated parameters.

In some examples, the RACH manager 1040 may be configured as or otherwise support a means for performing a RACH procedure with the network entity using the beam based on the paging occasion.

In some examples, to support receiving the system information message indicating the I-DRX configuration specific to the beam, the communications entity manager 1045 may be configured as or otherwise support a means for receiving the system information message indicating the I-DRX configuration is associated with one of a transmission and reception point associated with the beam or a set of beams including the beam.

In some examples, the I-DRX configuration includes a cycle duration, a paging frame location, and a number of paging occasions per cycle duration.

Figure 11:
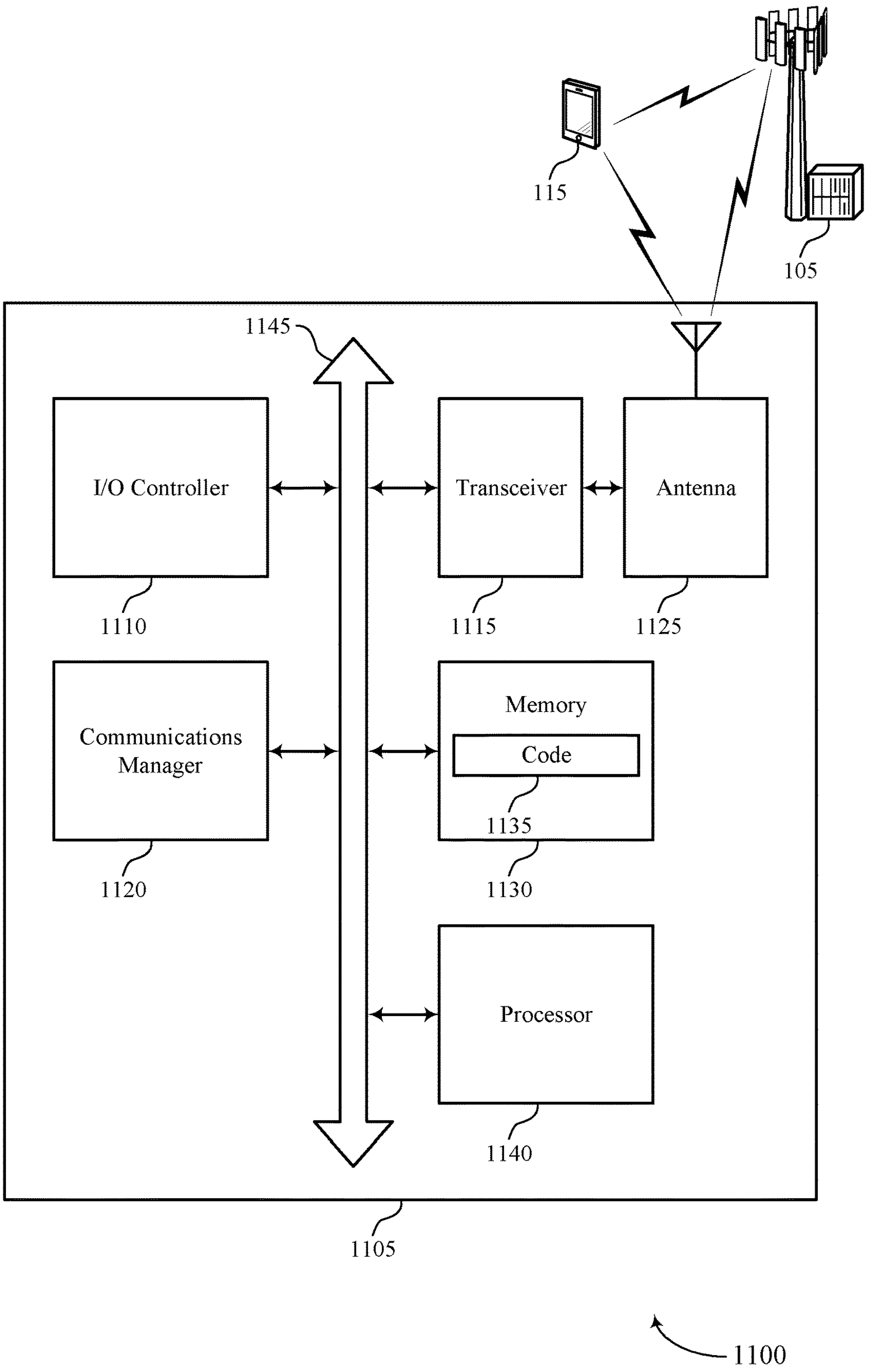
FIG. 11 shows a diagram of a system including a device that supports beam specific I-DRX configuration in accordance with one or more aspects of the present disclosure.

FIG. 11 shows a diagram of a system 1100 including a device 1105 that supports beam specific I-DRX configuration in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam specific I-DRX configuration). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a network entity via a beam, a system information message indicating an I-DRX configuration specific to the beam. The communications manager 1120 may be configured as or otherwise support a means for receiving, from the network entity via the beam while the UE is operating in an idle mode, a paging occasion in accordance with the I-DRX configuration specific to the beam.

By including or configuring the communications manager 1120 in accordance with examples as described herein, the device 1105 may support techniques for reduced power consumption, more efficient utilization of communication resources, and longer battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of beam specific I-DRX configuration as described herein, or the processor 1140 and the memory 1130 may be otherwise configured to perform or support such operations.

Figure 12:
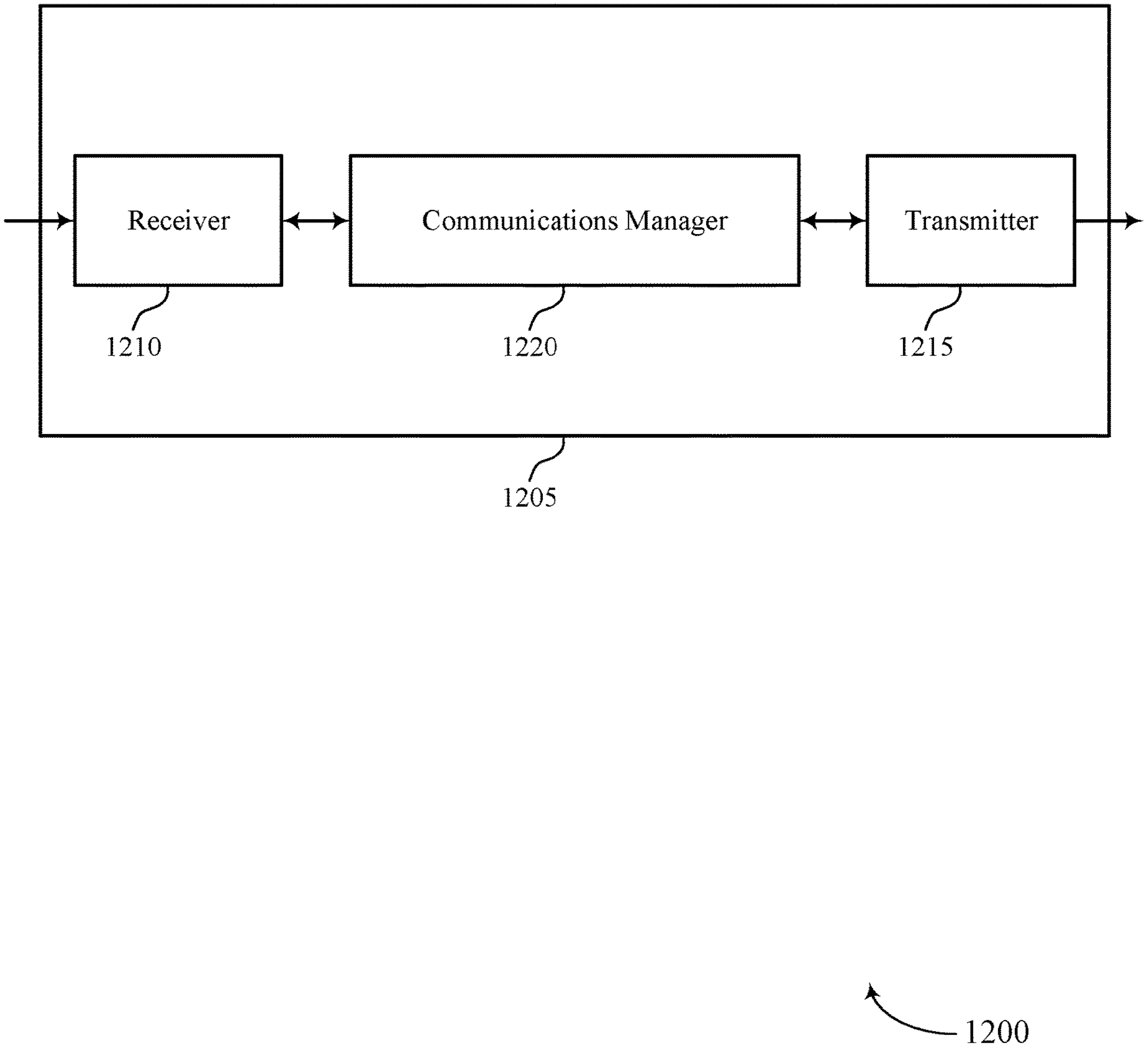
FIGS. 12 and 13 show block diagrams of devices that support beam specific I-DRX configuration in accordance with one or more aspects of the present disclosure.

FIG. 12 shows a block diagram 1200 of a device 1205 that supports beam specific I-DRX configuration in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of beam specific I-DRX configuration as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for transmitting, via a beam, a system information message indicating an I-DRX configuration specific to the beam. The communications manager 1220 may be configured as or otherwise support a means for transmitting, to a UE via the beam while the UE is operating in an idle mode, a paging occasion in accordance with the I-DRX configuration specific to the beam.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced power consumption and more efficient utilization of communication resources.

Figure 13:
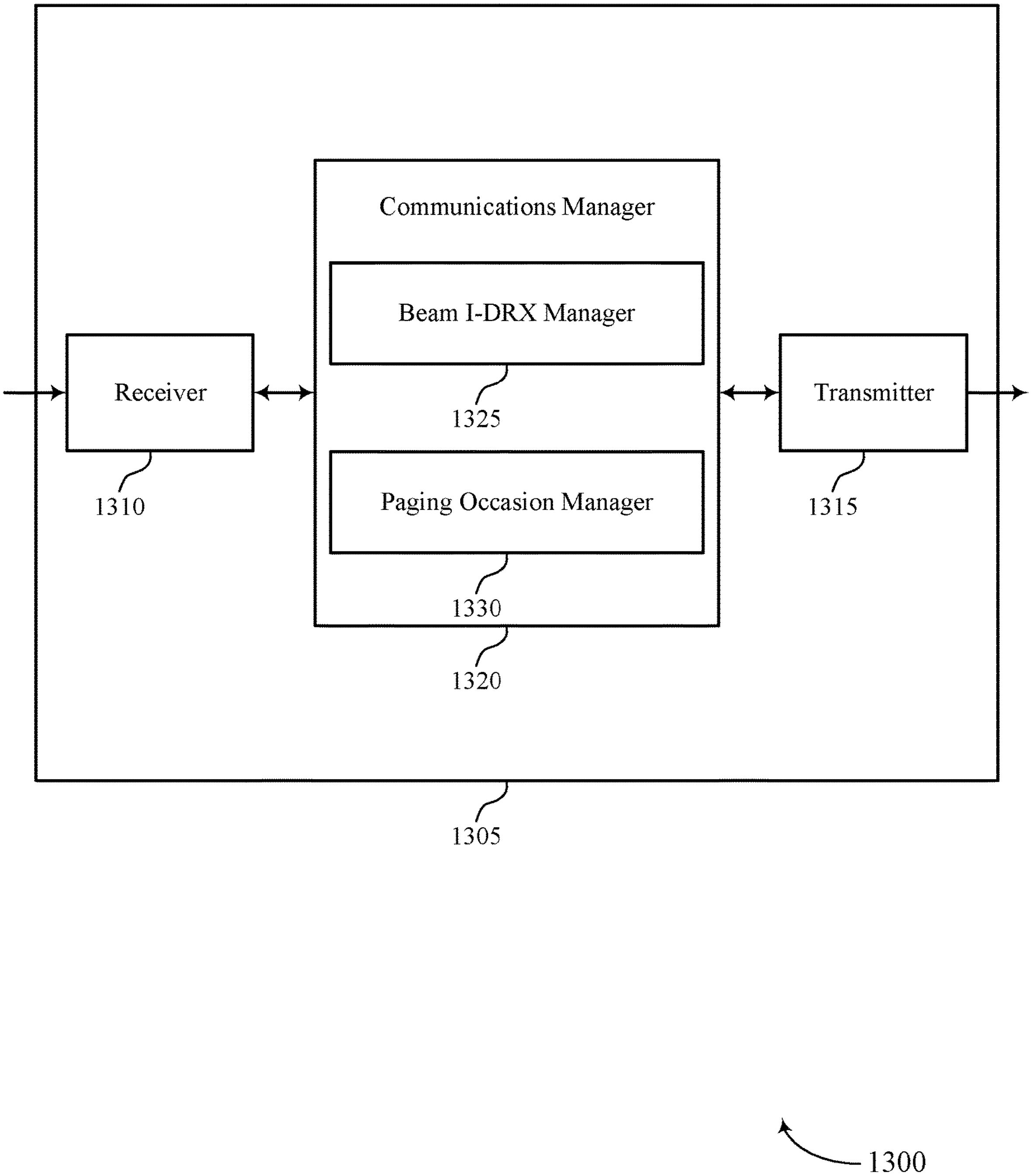

FIG. 13 shows a block diagram 1300 of a device 1305 that supports beam specific I-DRX configuration in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of beam specific I-DRX configuration as described herein. For example, the communications manager 1320 may include a beam I-DRX manager 1325 a paging occasion manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The beam I-DRX manager 1325 may be configured as or otherwise support a means for transmitting, via a beam, a system information message indicating an I-DRX configuration specific to the beam. The paging occasion manager 1330 may be configured as or otherwise support a means for transmitting, to a UE via the beam while the UE is operating in an idle mode, a paging occasion in accordance with the I-DRX configuration specific to the beam.

Figure 14:
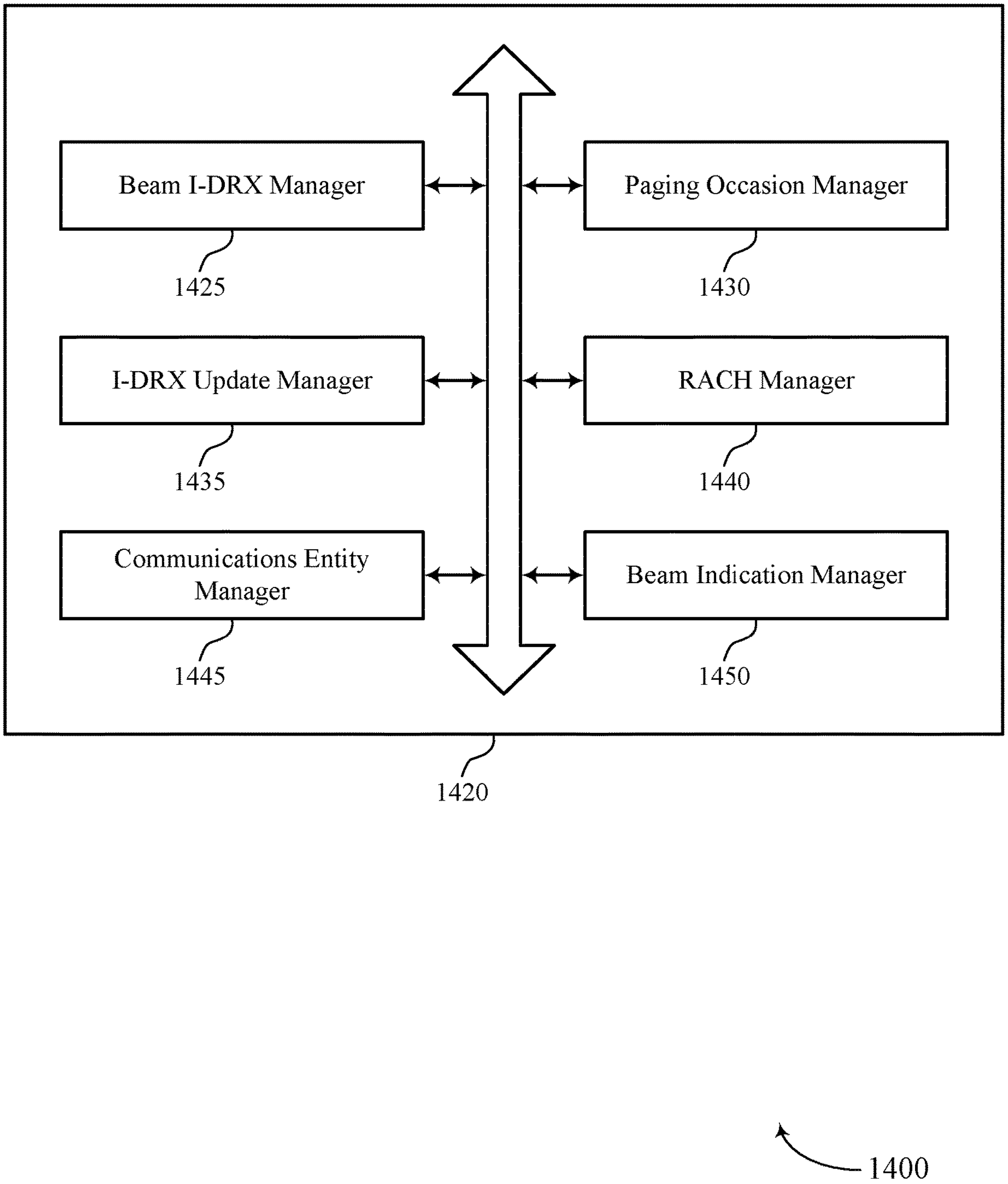
FIG. 14 shows a block diagram of a communications manager that supports beam specific I-DRX configuration in accordance with one or more aspects of the present disclosure.

FIG. 14 shows a block diagram 1400 of a communications manager 1420 that supports beam specific I-DRX configuration in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of beam specific I-DRX configuration as described herein. For example, the communications manager 1420 may include a beam I-DRX manager 1425, a paging occasion manager 1430, an I-DRX update manager 1435, a RACH manager 1440, a communications entity manager 1445, a beam indication manager 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The beam I-DRX manager 1425 may be configured as or otherwise support a means for transmitting, via a beam, a system information message indicating an I-DRX configuration specific to the beam. The paging occasion manager 1430 may be configured as or otherwise support a means for transmitting, to a UE via the beam while the UE is operating in an idle mode, a paging occasion in accordance with the I-DRX configuration specific to the beam.

In some examples, to support transmitting the system information message, the beam I-DRX manager 1425 may be configured as or otherwise support a means for transmitting an indication of a respective I-DRX configuration specific to each beam of the set of multiple beams.

In some examples, the paging occasion manager 1430 may be configured as or otherwise support a means for transmitting, to the UE via a second beam while the UE is operating in the idle mode, a second paging occasion in accordance with the respective I-DRX configuration specific to the second beam.

In some examples, the paging occasion is offset in time from the second paging occasion by a time period corresponding to a RACH procedure.

In some examples, the beam indication manager 1450 may be configured as or otherwise support a means for transmitting, to the UE and after the system information message, a paging error indication message indicating a subset of beams of the set of multiple beams. In some examples, the paging occasion manager 1430 may be configured as or otherwise support a means for transmitting, to the UE via the subset of beams while the UE is operating in an idle mode, one or more paging occasions in accordance with the respective I-DRX configurations specific to the subset of beams.

In some examples, the beam I-DRX manager 1425 may be configured as or otherwise support a means for transmitting, to the UE via a second beam, a second system information message indicating a second I-DRX configuration specific to the second beam. In some examples, the paging occasion manager 1430 may be configured as or otherwise support a means for transmitting, to the UE via the second beam while the UE is operating in the idle mode, a second paging occasion in accordance with the I-DRX configuration specific to the second beam.

In some examples, the I-DRX update manager 1435 may be configured as or otherwise support a means for transmitting, to the UE and after the system information message, a paging error indication message indicating one or more updated parameters for the I-DRX configuration specific to the beam, where the paging occasion is transmitted in accordance with the one or more updated parameters.

In some examples, the RACH manager 1440 may be configured as or otherwise support a means for performing a RACH procedure with the UE using the beam based on the paging occasion.

In some examples, to support transmitting the system information message indicating the I-DRX configuration specific to the beam, the communications entity manager 1445 may be configured as or otherwise support a means for transmitting the system information message indicating the I-DRX configuration is associated with one of a transmission and reception point associated with the beam or a set of beams including the beam.

In some examples, the I-DRX configuration includes a cycle duration, a paging frame location, and a number of paging occasions per cycle duration.

Figure 15:
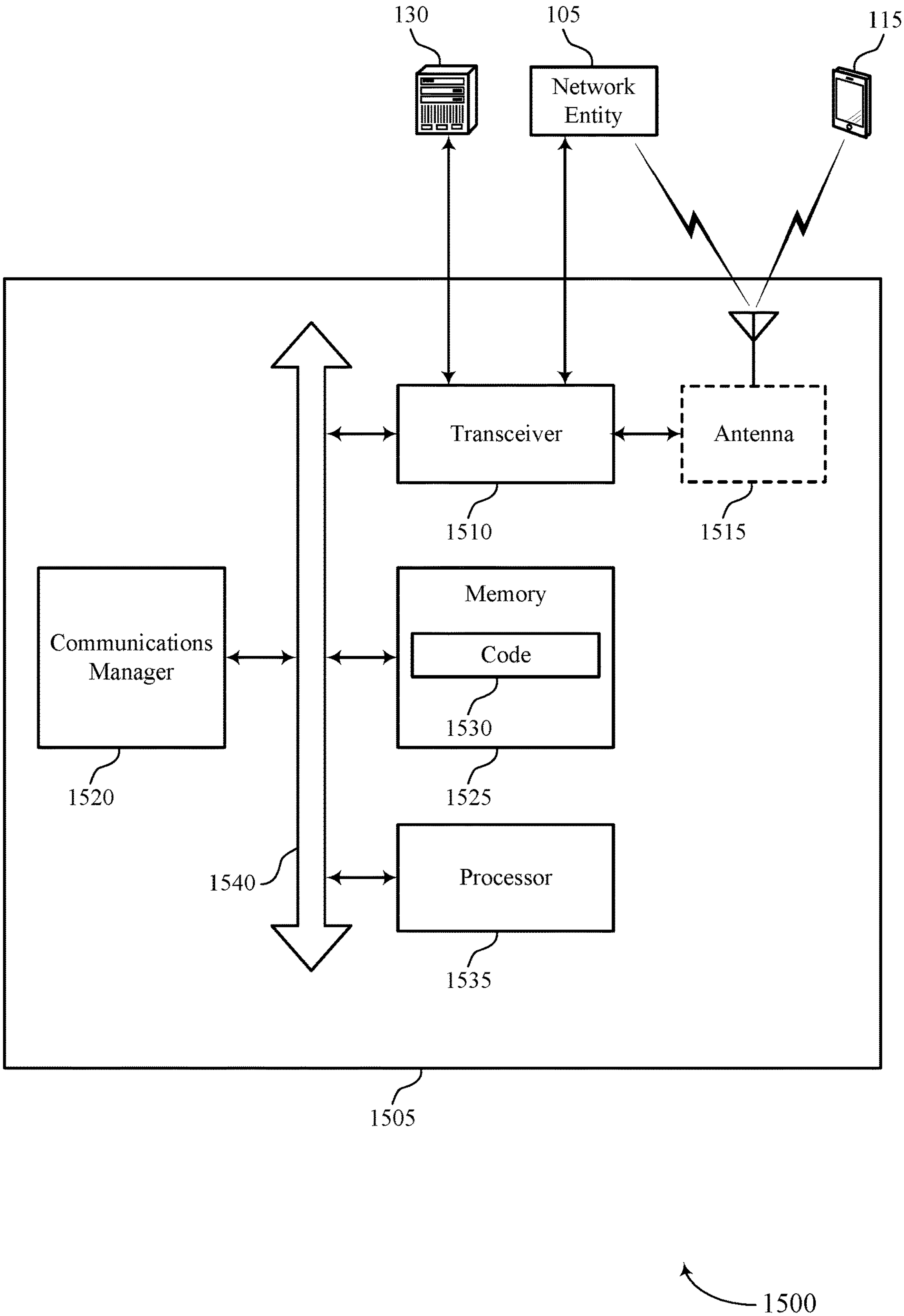
FIG. 15 shows a diagram of a system including a device that supports beam specific I-DRX configuration in accordance with one or more aspects of the present disclosure.

FIG. 15 shows a diagram of a system 1500 including a device 1505 that supports beam specific I-DRX configuration in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting beam specific I-DRX configuration). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for transmitting, via a beam, a system information message indicating an I-DRX configuration specific to the beam. The communications manager 1520 may be configured as or otherwise support a means for transmitting, to a UE via the beam while the UE is operating in an idle mode, a paging occasion in accordance with the I-DRX configuration specific to the beam.

By including or configuring the communications manager 1520 in accordance with examples as described herein, the device 1505 may support techniques for reduced power consumption and more efficient utilization of communication resources.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of beam specific I-DRX configuration as described herein, or the processor 1535 and the memory 1525 may be otherwise configured to perform or support such operations.

Figure 16:
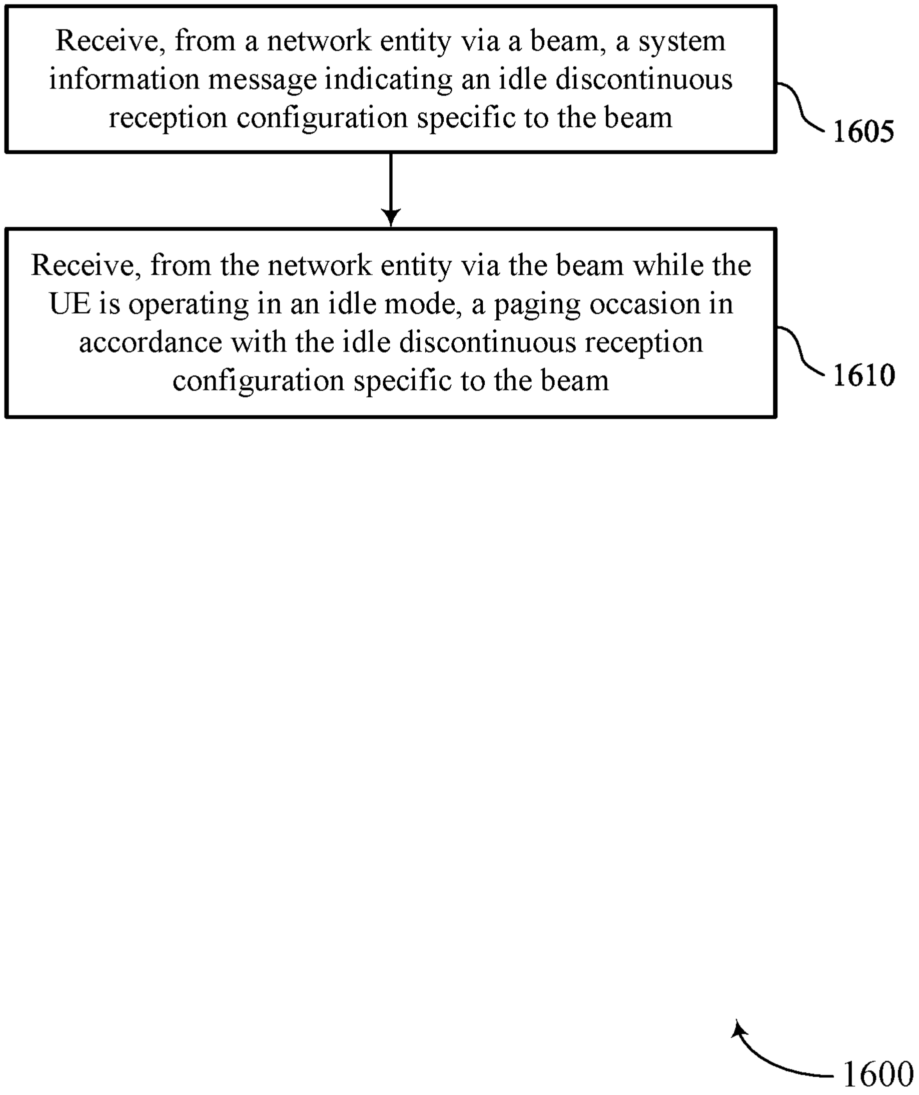
FIGS. 16 through 19 show flowcharts illustrating methods that support beam specific I-DRX configuration in accordance with one or more aspects of the present disclosure.

FIG. 16 shows a flowchart illustrating a method 1600 that supports beam specific I-DRX configuration in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity via a beam, a system information message indicating an I-DRX configuration specific to the beam. The operations of 1605 may be performed in accordance with examples as disclosed herein. In some examples, aspects of the operations of 1605 may be performed by a beam I-DRX manager 1025 as described with reference to FIG. 10.

At 1610, the method may include receiving, from the network entity via the beam while the UE is operating in an idle mode, a paging occasion in accordance with the I-DRX configuration specific to the beam. The operations of 1610 may be performed in accordance with examples as disclosed herein. In some examples, aspects of the operations of 1610 may be performed by a paging occasion manager 1030 as described with reference to FIG. 10.

Figure 17:
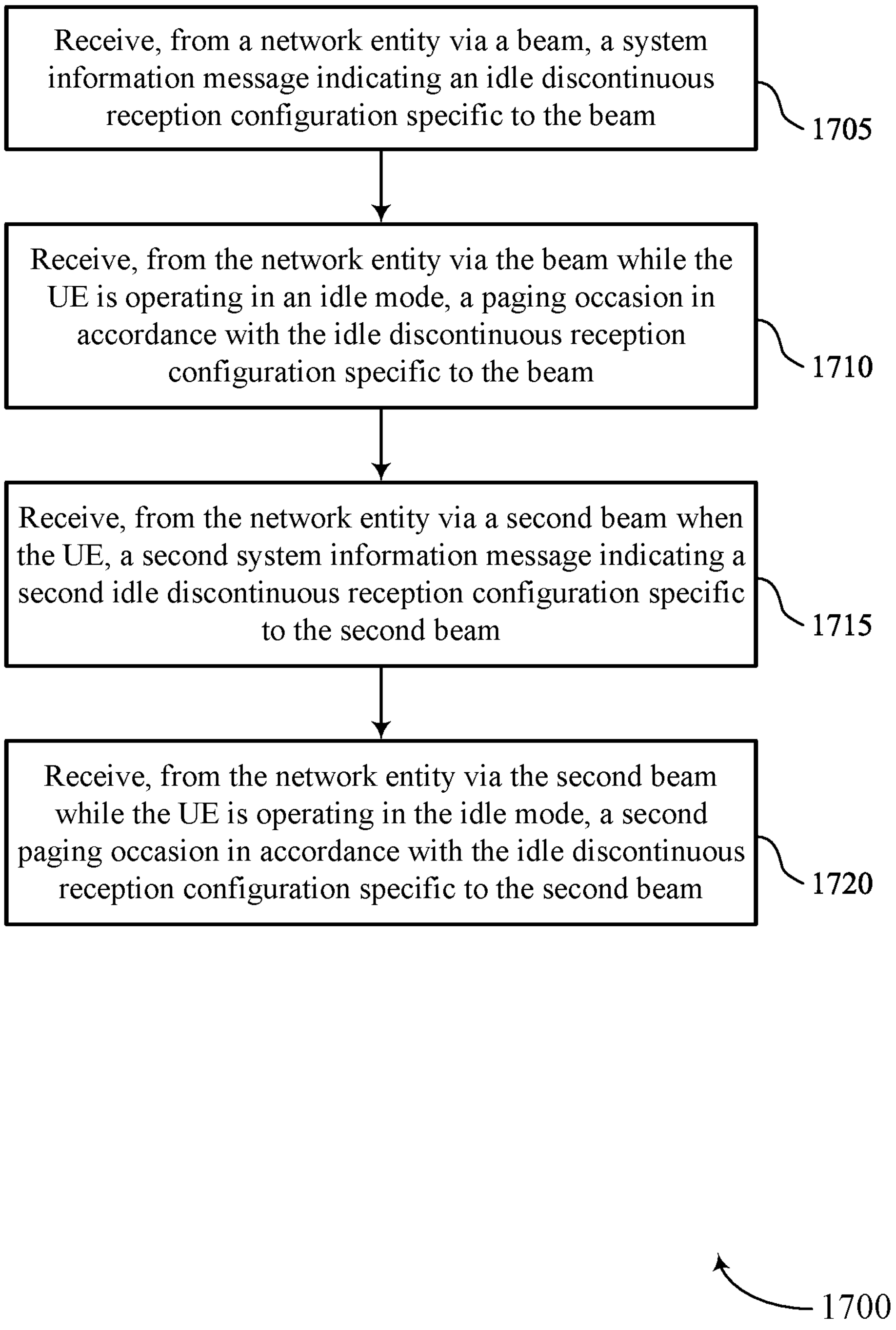

FIG. 17 shows a flowchart illustrating a method 1700 that supports beam specific I-DRX configuration in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity via a beam, a system information message indicating an I-DRX configuration specific to the beam. The operations of 1705 may be performed in accordance with examples as disclosed herein. In some examples, aspects of the operations of 1705 may be performed by a beam I-DRX manager 1025 as described with reference to FIG. 10.

At 1710, the method may include receiving, from the network entity via the beam while the UE is operating in an idle mode, a paging occasion in accordance with the I-DRX configuration specific to the beam. The operations of 1710 may be performed in accordance with examples as disclosed herein. In some examples, aspects of the operations of 1710 may be performed by a paging occasion manager 1030 as described with reference to FIG. 10.

At 1715, the method may include receiving, from the network entity via a second beam, a second system information message indicating a second I-DRX configuration specific to the second beam. The operations of 1715 may be performed in accordance with examples as disclosed herein. In some examples, aspects of the operations of 1715 may be performed by a beam I-DRX manager 1025 as described with reference to FIG. 10.

At 1720, the method may include receiving, from the network entity via the second beam while the UE is operating in the idle mode, a second paging occasion in accordance with the I-DRX configuration specific to the second beam. The operations of 1720 may be performed in accordance with examples as disclosed herein. In some examples, aspects of the operations of 1720 may be performed by a paging occasion manager 1030 as described with reference to FIG. 10.

Figure 18:
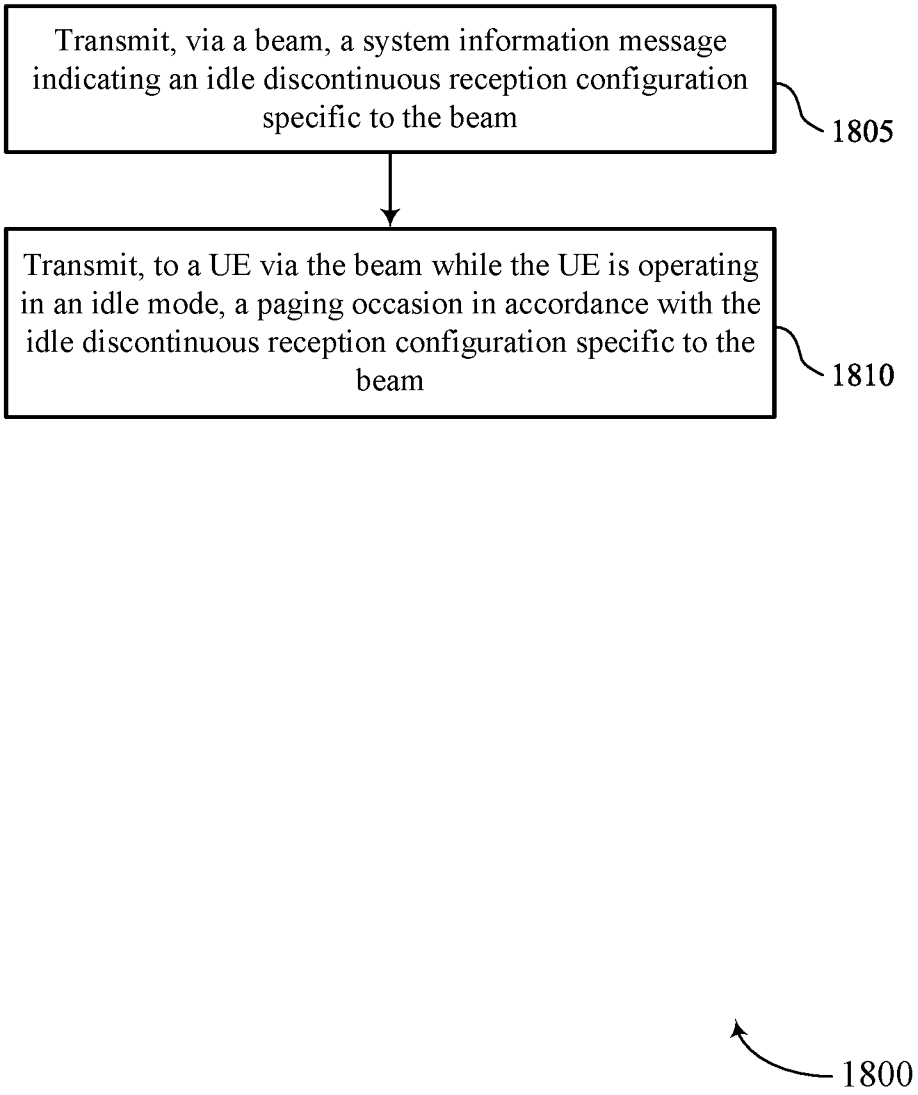

FIG. 18 shows a flowchart illustrating a method 1800 that supports beam specific I-DRX configuration in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, via a beam, a system information message indicating an I-DRX configuration specific to the beam. The operations of 1805 may be performed in accordance with examples as disclosed herein. In some examples, aspects of the operations of 1805 may be performed by a beam I-DRX manager 1425 as described with reference to FIG. 14.

At 1810, the method may include transmitting, to a UE via the beam while the UE is operating in an idle mode, a paging occasion in accordance with the I-DRX configuration specific to the beam. The operations of 1810 may be performed in accordance with examples as disclosed herein. In some examples, aspects of the operations of 1810 may be performed by a paging occasion manager 1430 as described with reference to FIG. 14.

Figure 19:
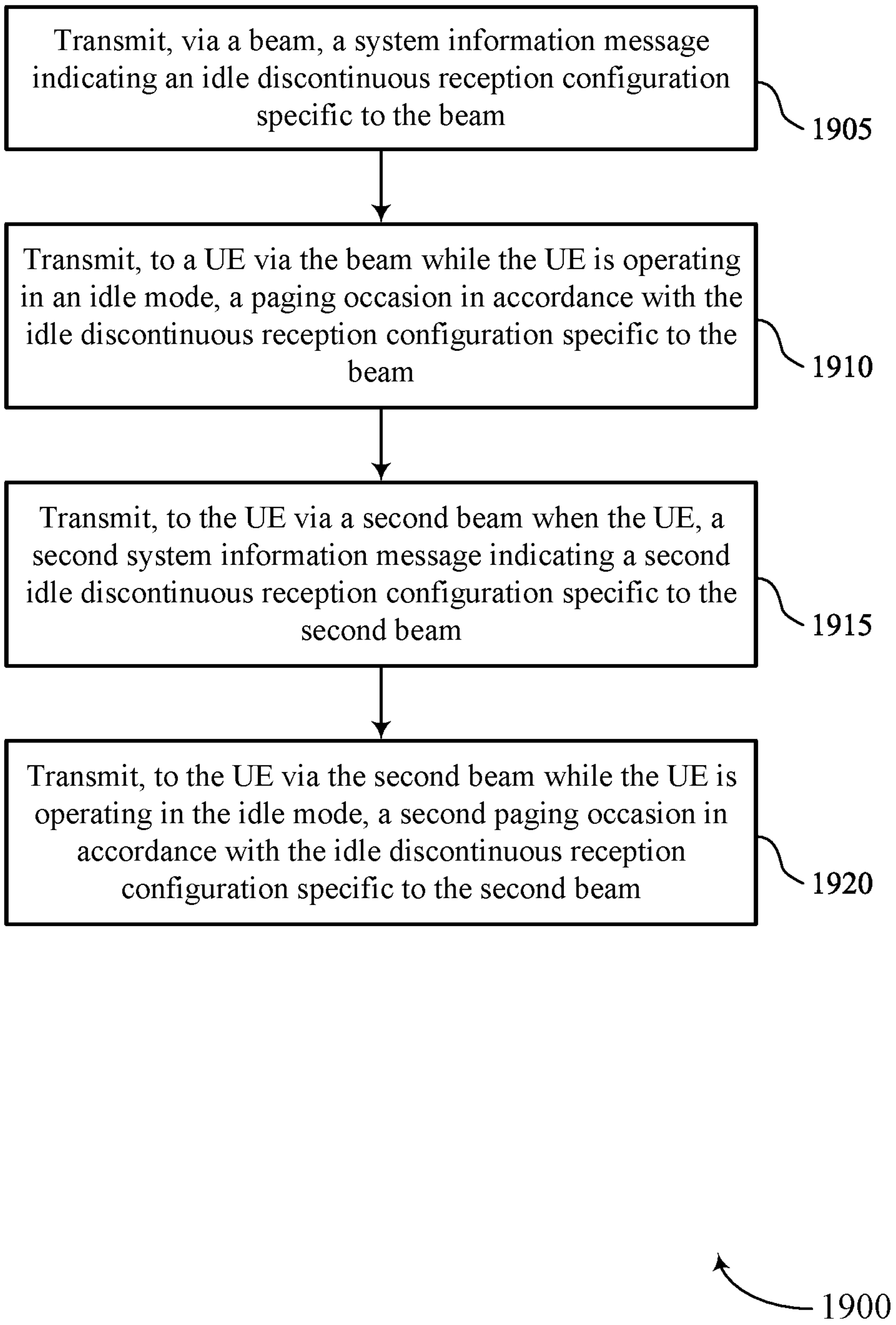

FIG. 19 shows a flowchart illustrating a method 1900 that supports beam specific I-DRX configuration in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, via a beam, a system information message indicating an I-DRX configuration specific to the beam. The operations of 1905 may be performed in accordance with examples as disclosed herein. In some examples, aspects of the operations of 1905 may be performed by a beam I-DRX manager 1425 as described with reference to FIG. 14.

At 1910, the method may include transmitting, to a UE via the beam while the UE is operating in an idle mode, a paging occasion in accordance with the I-DRX configuration specific to the beam. The operations of 1910 may be performed in accordance with examples as disclosed herein. In some examples, aspects of the operations of 1910 may be performed by a paging occasion manager 1430 as described with reference to FIG. 14.

At 1915, the method may include transmitting, to the UE via a second beam, a second system information message indicating a second I-DRX configuration specific to the second beam. The operations of 1915 may be performed in accordance with examples as disclosed herein. In some examples, aspects of the operations of 1915 may be performed by a beam I-DRX manager 1425 as described with reference to FIG. 14.

At 1920, the method may include transmitting, to the UE via the second beam while the UE is operating in the idle mode, a second paging occasion in accordance with the I-DRX configuration specific to the second beam. The operations of 1920 may be performed in accordance with examples as disclosed herein. In some examples, aspects of the operations of 1920 may be performed by a paging occasion manager 1430 as described with reference to FIG. 14.

The following provides an overview of aspects of the present disclosure:

Aspect 1: A method for wireless communications at a UE, comprising: receiving, from a network entity via a beam, a system information message indicating an I-DRX configuration specific to the beam; and receiving, from the network entity via the beam while the UE is operating in an idle mode, a paging occasion in accordance with the I-DRX configuration specific to the beam.

Aspect 2: The method of aspect 1, wherein the beam is associated with a cell, wherein the cell is associated with a plurality of beams, the plurality of beams including the beam, and wherein receiving the system information message comprises: receiving an indication of a respective I-DRX configuration specific to each beam of the plurality of beams.

Aspect 3: The method of aspect 2, further comprising: receiving, from the network entity via a second beam while the UE is operating in the idle mode, a second paging occasion in accordance with the respective I-DRX configuration specific to the second beam.

Aspect 4: The method of aspect 3, wherein the paging occasion is offset in time from the second paging occasion by a time period corresponding to a RACH procedure.

Aspect 5: The method of any of aspects 2 through 4, further comprising: receiving, from the network entity and after the system information message, a paging error indication message indicating a subset of beams of the plurality of beams; and receiving, from the network entity via the subset of beams while the UE is operating in the idle mode, one or more paging occasions in accordance with respective I-DRX configurations specific to the subset of beams.

Aspect 6: The method of any of aspects 1 through 5, further comprising: receiving, from the network entity via a second beam, a second system information message indicating a second I-DRX configuration specific to the second beam; and receiving, from the network entity via the second beam while the UE is operating in the idle mode, a second paging occasion in accordance with the I-DRX configuration specific to the second beam.

Aspect 7: The method of any of aspects 1 through 6, further comprising: receiving, from the network entity and after the system information message, a paging error indication message indicating one or more updated parameters for the I-DRX configuration specific to the beam, wherein the paging occasion is received in accordance with the one or more updated parameters.

Aspect 8: The method of any of aspects 1 through 7, further comprising: performing a RACH procedure with the network entity using the beam based on the paging occasion.

Aspect 9: The method of any of aspects 1 through 8, wherein receiving the system information message indicating the I-DRX configuration specific to the beam comprises: receiving the system information message indicating the I-DRX configuration is associated with one of a transmission and reception point associated with the beam or a set of beams including the beam.

Aspect 10: The method of any of aspects 1 through 9, wherein the I-DRX configuration comprises a cycle duration, a paging frame location, and a number of paging occasions per cycle duration.

Aspect 11: A method for wireless communications at a network entity, comprising: transmitting, via a beam, a system information message indicating an I-DRX configuration specific to the beam; and transmitting, to a UE via the beam while the UE is operating in an idle mode, a paging occasion in accordance with the I-DRX configuration specific to the beam.

Aspect 12: The method of aspect 11, wherein the beam is associated with a cell, wherein the cell is associated with a plurality of beams, the plurality of beams including the beam, and wherein transmitting the system information message comprises: transmitting an indication of a respective I-DRX configuration specific to each beam of the plurality of beams.

Aspect 13: The method of aspect 12, further comprising: transmitting, to the UE via a second beam while the UE is operating in the idle mode, a second paging occasion in accordance with the respective I-DRX configuration specific to the second beam.

Aspect 14: The method of aspect 13, wherein the paging occasion is offset in time from the second paging occasion by a time period corresponding to a RACH procedure.

Aspect 15: The method of any of aspects 12 through 14, further comprising: transmitting, to the UE and after the system information message, a paging error indication message indicating a subset of beams of the plurality of beams; and transmitting, to the UE via the subset of beams while the UE is operating in the idle mode, one or more paging occasions in accordance with respective I-DRX configurations specific to the subset of beams.

Aspect 16: The method of any of aspects 11 through 15, further comprising: transmitting, to the UE via a second beam, a second system information message indicating a second I-DRX configuration specific to the second beam; and transmitting, to the UE via the second beam while the UE is operating in the idle mode, a second paging occasion in accordance with the I-DRX configuration specific to the second beam.

Aspect 17: The method of any of aspects 11 through 16, further comprising: transmitting, to the UE and after the system information message, a paging error indication message indicating one or more updated parameters for the I-DRX configuration specific to the beam, wherein the paging occasion is transmitted in accordance with the one or more updated parameters.

Aspect 18: The method of any of aspects 11 through 17, further comprising: performing a RACH procedure with the UE using the beam based on the paging occasion.

Aspect 19: The method of any of aspects 11 through 18, wherein transmitting the system information message indicating the I-DRX configuration specific to the beam comprises: transmitting the system information message indicating the I-DRX configuration is associated with one of a transmission and reception point associated with the beam or a set of beams including the beam.

Aspect 20: The method of any of aspects 11 through 19, wherein the I-DRX configuration comprises a cycle duration, a paging frame location, and a number of paging occasions per cycle duration.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a network entity, comprising a processor; memory coupled with the processor; and instructions stored in the memory and executable by the processor to cause the apparatus to perform a method of any of aspects 11 through 20.

Aspect 25: An apparatus for wireless communications at a network entity, comprising at least one means for performing a method of any of aspects 11 through 20.

Aspect 26: A non-transitory computer-readable medium storing code for wireless communications at a network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, a single system information message via a first beam indicating a first idle discontinuous reception configuration specific to the first beam and a second idle discontinuous reception configuration specific to a second beam, the first idle discontinuous reception configuration different than the second idle discontinuous reception configuration, wherein the first beam and the second beam are associated with a cell; and receiving, from the network entity via the first beam while the UE is operating in an idle mode, a paging occasion in accordance with the first idle discontinuous reception configuration specific to the first beam.

2. The method of claim 1, wherein the cell is associated with a plurality of beams, the plurality of beams including the first beam and the second beam, and wherein receiving the single system information message comprises:

receiving an indication of a respective idle discontinuous reception configuration specific to each beam of the plurality of beams.

3. The method of claim 2, further comprising:

receiving, from the network entity via the second beam while the UE is operating in the idle mode, a second paging occasion in accordance with the second idle discontinuous reception configuration specific to the second beam.

4. The method of claim 3, wherein the paging occasion is offset in time from the second paging occasion by a time period corresponding to a random access channel procedure.

5. The method of claim 2, further comprising:

receiving, from the network entity and after the single system information message, a paging error indication message indicating a subset of beams of the plurality of beams; and receiving, from the network entity via the subset of beams while the UE is operating in the idle mode, one or more paging occasions in accordance with respective idle discontinuous reception configurations specific to the subset of beams.

6. The method of claim 2, wherein receiving the single system information message comprises:

receiving the single system information message via the first beam that comprises the indication of the respective idle discontinuous reception configuration specific to each beam of the plurality of beams.

7. The method of claim 1, further comprising:

receiving, from the network entity and after the single system information message, a paging error indication message indicating one or more updated parameters for the first idle discontinuous reception configuration specific to the first beam, wherein the paging occasion is received in accordance with the one or more updated parameters.

8. The method of claim 1, further comprising:

performing a random access channel procedure with the network entity using the first beam based on the paging occasion.

9. The method of claim 1, wherein receiving the single system information message comprises:

receiving the single system information message indicating the first idle discontinuous reception configuration is associated with one of a transmission and reception point associated with the first beam or a set of beams including the first beam.

10. The method of claim 1, wherein the first idle discontinuous reception configuration comprises a cycle duration, a paging frame location, and a number of paging occasions per cycle duration.

11. The method of claim 10, wherein the second idle discontinuous reception configuration comprises a second cycle duration, a second paging frame location, and a second number of paging occasions per cycle duration, wherein at least one of:

the second cycle duration is different than the cycle duration;

the second paging frame location is different than the paging frame location; or the second number of paging occasions per cycle duration is different than the number of paging occasions per cycle duration.

12. A method for wireless communications at a network entity, comprising:

transmitting a single system information message via a first beam indicating a first idle discontinuous reception configuration specific to the first beam and a second idle discontinuous reception configuration specific to a second beam, the first idle discontinuous reception configuration different than the second idle discontinuous reception configuration, wherein the first beam and the second beam are associated with a cell; and transmitting, to a user equipment (UE) via the first beam while the UE is operating in an idle mode, a paging occasion in accordance with the first idle discontinuous reception configuration specific to the first beam.

13. The method of claim 12, wherein the cell is associated with a plurality of beams, the plurality of beams including the first beam and the second beam, and wherein transmitting the single system information message comprises:

transmitting an indication of a respective idle discontinuous reception configuration specific to each beam of the plurality of beams.

14. The method of claim 13, further comprising:

transmitting, to the UE via the second beam while the UE is operating in the idle mode, a second paging occasion in accordance with the second idle discontinuous reception configuration specific to the second beam.

15. The method of claim 14, wherein the paging occasion is offset in time from the second paging occasion by a time period corresponding to a random access channel procedure.

16. The method of claim 13, further comprising:

transmitting, to the UE and after the single system information message, a paging error indication message indicating a subset of beams of the plurality of beams; and transmitting, to the UE via the subset of beams while the UE is operating in the idle mode, one or more paging occasions in accordance with respective idle discontinuous reception configurations specific to the subset of beams.

17. The method of claim 13, wherein transmitting the single system information message comprises:

transmitting the single system information message via the first beam that comprises the indication of the respective idle discontinuous reception configuration specific to each beam of the plurality of beams.

18. The method of claim 12, further comprising:

transmitting, to the UE and after the single system information message, a paging error indication message indicating one or more updated parameters for the first idle discontinuous reception configuration specific to the first beam, wherein the paging occasion is transmitted in accordance with the one or more updated parameters.

19. The method of claim 12, further comprising:

performing a random access channel procedure with the UE using the first beam based on the paging occasion.

20. The method of claim 12, wherein transmitting the single system information message comprises:

transmitting the single system information message indicating the first idle discontinuous reception configuration is associated with one of a transmission and reception point associated with the first beam or a set of beams including the first beam.

21. The method of claim 12, wherein the first idle discontinuous reception configuration comprises a cycle duration, a paging frame location, and a number of paging occasions per cycle duration.

22. A user equipment (UE) for wireless communications, comprising:

one or more memories storing processor executable code; and one or more processors coupled with the one or more memories and operable to execute the code to cause the UE to:

receive, from a network entity, a single system information message via a first beam indicating a first idle discontinuous reception configuration specific to the first beam and a second idle discontinuous reception configuration specific to a second beam, the first idle discontinuous reception configuration different than the second idle discontinuous reception configuration, wherein the first beam and the second beam are associated with a cell; and receive, from the network entity via the first beam while the UE is operating in an idle mode, a paging occasion in accordance with the first idle discontinuous reception configuration specific to the first beam.

23. The UE of claim 22, wherein the cell is associated with a plurality of beams, the plurality of beams including the first beam and the second beam, and wherein, to receive the single system information message, the one or more processors are operable to cause the UE to:

receive an indication of a respective idle discontinuous reception configuration specific to each beam of the plurality of beams.

24. The UE of claim 23, wherein the one or more processors are further operable to execute the code to cause the UE to:

receive, from the network entity via the second beam while the UE is operating in the idle mode, a second paging occasion in accordance with the second idle discontinuous reception configuration specific to the second beam.

25. The UE of claim 24, wherein the paging occasion is offset in time from the second paging occasion by a time period corresponding to a random access channel procedure.

26. The UE of claim 23, wherein the one or more processors are further operable to execute the code to cause the UE to:

receive, from the network entity and after the single system information message, a paging error indication message indicating a subset of beams of the plurality of beams; and receive, from the network entity via the subset of beams while the UE is operating in the idle mode, one or more paging occasions in accordance with respective idle discontinuous reception configurations specific to the subset of beams.

27. The UE of claim 23, wherein, to receive the single system information message, the one or more processors are operable to execute the code to cause the UE to:

receive the single system information message via the first beam that comprises the indication of the respective idle discontinuous reception configuration specific to each beam of the plurality of beams.

28. A network entity for wireless communications, comprising:

one or more memories storing processor executable code; and one or more processors coupled with the one or more memories and operable to execute the code to cause the network entity to:

transmit a single system information message via a first beam indicating a first idle discontinuous reception configuration specific to the first beam and a second idle discontinuous reception configuration specific to a second beam, the first idle discontinuous reception configuration different than the second idle discontinuous reception configuration, wherein the first beam and the second beam are associated with a cell; and transmit, to a user equipment (UE) via the first beam while the UE is operating in an idle mode, a paging occasion in accordance with the first idle discontinuous reception configuration specific to the first beam.

29. The network entity of claim 28, wherein the cell is associated with a plurality of beams, the plurality of beams including the first beam and the second beam, and wherein, to transmit the single system information message, the one or more processors are operable to execute the code to cause the network entity to:

transmit an indication of a respective idle discontinuous reception configuration specific to each beam of the plurality of beams.

30. The network entity of claim 29, wherein, to receive the single system information message, the one or more processors are operable to execute the code to cause the network entity to:

transmit the single system information message via the first beam that comprises the indication of the respective idle discontinuous reception configuration specific to each beam of the plurality of beams.

* * * * *